(12) United States Patent
Dreier et al.

(10) Patent No.: US 11,108,308 B2
(45) Date of Patent: Aug. 31, 2021

(54) APPARATUS FOR INSTALLING A WIRE PACKAGE INTO AN ELECTRICAL MACHINE

(71) Applicant: GROB-WERKE GmbH & Co. KG, Mindelheim (DE)

(72) Inventors: Günter Dreier, Deisenhausen (DE); Ralf Rauscher, Fellheim (DE); Korbinian Seidel, Mindelheim (DE); Simon Fendt, Kirchheim (DE)

(73) Assignee: GROB-WERKE GMBH & CO. KG, Mindelheim (DE)

( * ) Notice: Subject to any disclaimer, the term of this patent is extended or adjusted under 35 U.S.C. 154(b) by 330 days.

(21) Appl. No.: 16/062,420

(22) PCT Filed: Dec. 14, 2016

(86) PCT No.: PCT/EP2016/081082
§ 371 (c)(1),
(2) Date: Jun. 14, 2018

(87) PCT Pub. No.: WO2017/102892
PCT Pub. Date: Jun. 22, 2017

(65) Prior Publication Data
US 2018/0375408 A1    Dec. 27, 2018

(30) Foreign Application Priority Data
Mar. 8, 2016    (DE) .................... 10 2016 104 228.5

(51) Int. Cl.
*H02K 15/06*    (2006.01)
*H02K 15/02*    (2006.01)

(52) U.S. Cl.
CPC ......... *H02K 15/066* (2013.01); *H02K 15/028* (2013.01); *H02K 15/065* (2013.01)

(58) Field of Classification Search
CPC .. H02K 15/066; H02K 15/065; H02K 15/028; H02K 15/0056; Y10T 29/49009; Y10T 29/49073; Y10T 29/53157
(Continued)

(56) References Cited

U.S. PATENT DOCUMENTS 3,815,206 A * 6/1974 Smith .................. H02K 15/068
                                                    29/606
4,901,433 A * 2/1990 Barrera .................. H02K 15/10
                                                    29/596

(Continued)

FOREIGN PATENT DOCUMENTS

DE    10 2010 063 920 A1    6/2012
DE    11 2011 100 868 T5    12/2012
(Continued)

OTHER PUBLICATIONS

European Office Action dated Mar. 10, 2020.
(Continued)

*Primary Examiner* — Donghai D Nguyen
(74) *Attorney, Agent, or Firm* — Jacobson Holman PLLC

(57) ABSTRACT

The invention relates to a package carrier for installing a plurality of wire windings into a component such as a stator or a rotor of an electrical machine, the component having a plurality of grooves running longitudinally which are designed to receive wire sections of the wire windings.

11 Claims, 17 Drawing Sheets

(58) Field of Classification Search
USPC .................................. 29/596, 598, 606, 735
See application file for complete search history.

(56) References Cited

U.S. PATENT DOCUMENTS

| | | | |
|---|---|---|---|
| 6,722,016 B2* | 4/2004 | DeHart | H02K 15/0056 29/596 |
| 2004/0068858 A1 | 4/2004 | Kuroyanagi et al. | |
| 2007/0143983 A1 | 6/2007 | Yamaguchi et al. | |
| 2008/0201935 A1 | 8/2008 | Nakayama et al. | |
| 2008/0258570 A1 | 10/2008 | Yamaguchi et al. | |
| 2010/0194230 A1 | 8/2010 | Naganawa et al. | |

FOREIGN PATENT DOCUMENTS

| | | |
|---|---|---|
| DE | 11 2012 003 437 T5 | 4/2014 |
| DE | 11 2012 003 703 T5 | 7/2014 |
| EP | 0528115 | 2/1993 |
| EP | 2 009 768 A2 | 6/2008 |
| JP | 2008-206334 A | 9/2008 |

OTHER PUBLICATIONS

Notification of the First Chinese Office Action, dated Oct. 9, 2019 (14 pages).
International Search Report, dated Aug. 25, 2017.
German Search Report, dated Nov. 11, 2016.

* cited by examiner

APPARATUS FOR INSTALLING A WIRE PACKAGE INTO AN ELECTRICAL MACHINE

BACKGROUND OF THE INVENTION

The invention relates to a method for installing a plurality of wire windings into a component, such as a stator or a rotor of an electrical machine, wherein the component has a plurality of longitudinal grooves which are included for the purpose of receiving wire sections of the wire windings.

The invention also relates to an apparatus for installing a plurality of wire windings into a component, such as the stator or rotor of an electrical machine. Moreover, the invention relates to an associated press-insertion apparatus, and to an associated method.

An electrical machine, such as an electric motor, consists of a generally stationary stator and a rotor which is mounted to rotate relative thereto. Such electrical machines are used to convert mechanical energy into electrical energy, or vice-versa. These concepts are well-known. The design and arrangement of the wire windings in the component of the electrical machine, such as the stator or rotor of an electric motor, are crucial for good efficiency of such systems. By way of example, methods are known in which each of the wires is inserted individually parallel to the longitudinal extension of the groove.

Such an approach is extremely time-consuming, which is why the problem addressed by the present invention is that of improving the prior art.

SUMMARY OF THE INVENTION

To address this problem, the invention proposes a method for the installation of a wire package, consisting of a plurality of wire windings, into a component such as a stator or a rotor of an electrical machine, wherein the component has a plurality of grooves which run longitudinally and which are included for the purpose of accommodating wire sections of the wire windings, wherein the wire package is held by a package carrier, the package carrier is positioned with the wire package on or in the component, and at least a part of the package carrier or at least one element which engages against the package carrier is moved in such a manner that at least a portion of the wire package is moved into at least one groove of the component in a movement which is radial with respect to a component axis.

In addition, this problem is addressed according to the invention by an apparatus for the installation of a wire package, consisting of a plurality of wire windings, into a component such as the stator or rotor of an electrical machine, wherein the apparatus has a package carrier which is designed to receive the wire package, and a part of the package carrier or at least one element which can engage against the package carrier effects a movement of at least a portion of the wire package, and the apparatus is particularly included for carrying out the method described above and/or below.

As already stated, the stator is generally a stationary component of the electrical machine, and the rotor is a component rotating relative thereto about a component axis. Usually, the axis of rotation of the rotor is the same as the component axis. However, the component axis can also be the central axis of the stator. The rotor moves relative to the stator. Typically, the stator in electrical machines is on the outside, and receives the rotor. However, this concept can also be reversed, such that the stator is arranged on the inside and the rotor surrounds the stator. The suggestion according to the invention is not limited to the installation of the windings into the grooves of a stator. The suggestion can also be realized in the installed state of rotating components, which can likewise have grooves for receiving wire sections.

According to the invention, the package carrier with the wire package is positioned on or in the component. Depending on the kinematic configuration, the wire package must be installed from the outside inward or from the inside outward. Accordingly, the wire package must be positioned on the component (from the outside inward) or in the component (from the inside outward).

According to the invention, at least a part of the package carrier, or at least one element which can engage against the package carrier, can be moved. In this case, the package carrier itself is constructed of a plurality of parts and/or elements, and at least one or more of these parts of the package carrier are expediently movable so as to effect the desired radial movement of the wire package or a portion of the wire package.

An important advantage of the suggestion according to the invention is that the wire windings in this suggestion are not wound into the grooves. Rather, the wire windings are furnished in a prefabricated wire package which is prefabricated in machines which are specialized for this purpose. This prefabrication significantly increases the efficiency of the entire production process.

A further advantage of the suggestion according to the invention is that the wire package is furnished in the installation-ready, final arrangement on the package carrier, and is then inserted with a relatively simple movement into the grooves of the component. Expediently, the arrangement is selected to be such that the individual wire windings are held in a precisely positioned manner, so that it is then possible to execute the insertion movement, which is carried out with a tight fit, in an optimized manner.

In this case, it is expedient that "only" a radial movement and/or a movement with a predominantly radial movement component (in each case relative to the component axis) is used. This means that considerable, additional mechanical stress on the wire package is not necessary. This results in an installation of the wire sections into the grooves with the least possible tension and torsion, which leads to high process reliability. It should be noted that it is relatively simple to achieve a radial movement from a constructive point of view—which is advantageous particularly in an arrangement in which not much space is available.

A further advantage of the suggestion according to the invention lies in the fact that the processing of pre-commissioned wire packages makes it possible to manufacture each of the wire coils from wires having greater cross-sections. With the winding and/or insertion technology known in the prior art (the movement to insert the wire parallel to the longitudinal extension of the groove and/or axially to the component axis), these cross-sections were not possible, or involved great complexity, due to the high rigidity of these wires. Since, however, wire packages with significantly greater individual cross-sections of the wires can be reliably installed with the technology according to the invention, electrical machines produced in this manner can also be operated at higher current flows.

The suggestion according to the invention combines secure process management for the manufacture of the components of corresponding electrical machines with better properties in the use of such electrical machines.

Furthermore, in the proposal, the wire package is advantageously moved into a plurality of, or into all of, the grooves of the/each wire section(s) at the same time. The arrangement is provided in this case in such a manner that a plurality of wire sections, each arranged parallel to the others, is installed in one groove. Expediently, this plurality of wire sections per groove is inserted in a radial movement step. As a result, the production is significantly accelerated.

In a preferred embodiment of the suggestion, the package carrier with the wire package is positioned relative to the component in such a manner that each of the wire sections is positioned opposite the respective groove which receives the wire section, before the radial movement begins. Advantageously, the movement of the package carrier relative to the component is decoupled—that is, a movement of the package carrier relative to the component is possible—to thereby enable adapting the orientation of the wire windings/wire sections to be inserted to the respective grooves.

Such a process management is also easy to implement, since the respective movements are decoupled from each other. First, the package carrier is positioned relative to the component, which can be done for example with an axial movement (relative to the component axis). Then, the package carrier is aligned in the circumferential direction relative to the component by a rotational movement of the package carrier (or of the component) about the component axis. For example, the component carries at least one corresponding marking to allow mechanical or visual monitoring of the alignment. If the two elements are then aligned correctly with one another, the radial insertion movement is performed. Since the individual movements are performed one after the other, a simple kinematic chain results.

In addition, after the package carrier is positioned relative to the component, the element can engage against the package carrier, and the element particularly detaches, by a radial movement relative to the component axis, the wire sections from the package carrier and pushes them into the respective groove. In this implementation variant, an element which is independent of the package carrier engages against the same. This can occur by a (relative to the component axis) radial and or axial movement, by way of example. The element then effects, monitored by the controller, the insertion movement, wherein the wire windings of the wire package are typically held on the package carrier in a suitable manner, such that they must initially be detached from the package carrier as a result.

In an advantageous embodiment, the package carrier is rotated in a rotational movement about the component axis, and the element has a glide edge which, in cooperation with the rotational movement, detaches the wire sections from the package carrier and pushes them into the respective groove. In this embodiment, the radial insertion movement is derived from the rotational movement of the package carrier relative to the component, which is used in any case for the alignment of the package carrier. This dual benefit also reduces the manufacturing cost of such a device. This step follows, for example, the radial engaging movement.

Expediently, at least one element is included on both sides of the package carrier relative to the component axis, said element detaching the wire sections from the package carrier during the rotational movement, and inserting them into the respective groove. The wire package consists of wire sections which are inserted into the grooves, and of gable-shaped connecting elements in between, which protrude out of the package carrier from above and below when in the transport position. Due to the arrangement of one element on each of the two ends of the package carrier (for example, on the top and bottom), the respective wire section is moved from two sides, facilitating the insertion movement.

In a first suggestion, the engaged element is then moved radially (radial engagement movement), thereby effecting an insertion movement onto the wire package, which pushes the wire sections into the groove at least in a section thereof.

In a further preferred embodiment, the package carrier positions the wire package in a frustoconical arrangement relative to the component, then the package carrier moves in such a manner that the wire package moves into a cylindrical arrangement, while at the same time the individual wire sections are detached from the package carrier and pushed into the respective grooves. The frustoconical arrangement in this case refers to the outer contour of the wire package. This frustoconical and/or conical arrangement considerably facilitates the insertion of the package carrier into the interior of the component (stator). If the package carrier is positioned and aligned, at least one section of the package carrier moves in a way which aligns the frustoconical wire package into a cylindrical shape, and at the same time pushes the wire sections into the grooves.

Furthermore, the diameter of the base of the frustoconical arrangement is advantageously greater than the inside diameter of the component, such that the individual wire sections are guided by the respective grooves during the positioning movement of the package carrier relative to the component. Such a procedure significantly simplifies the installation, because the wire sections are captured by the respective grooves as soon as the package carrier is inserted into the interior of the component. At this point, it is only necessary to execute a fold-up movement to insert the wire sections completely into the grooves.

As already stated, the invention also comprises an apparatus for installing a wire package, consisting of a plurality of wire windings, into a component such as the stator or rotor of an electrical machine, as described above.

Advantageously, the apparatus has a component receptacle, and the component receptacle and the package carrier can be moved toward each another—and particularly can be rotated relative to each other. Advantageously, both the component receptacle and the package carrier have a rotary drive which is monitored by the same machine controller. This enables both relative alignment movements toward each other, and also synchronous rotational movements.

Furthermore, according to the suggestion, the package carrier advantageously has a cylindrical, frustoconical or circular shape, and has a plurality of holding elements for different wire sections of the wire windings on the inside or outside thereof. The design of the package carrier is highly variable. Advantageously, a rotationally symmetrical configuration is preferred—but without the intention of limiting the invention thereto. The package carrier in this case expediently has at least one holding element for all the wire sections which are to be installed in the same groove (which is then, by way of example, used multiple times). For example, the holding elements are preferably designed as holding slots or as retaining clips, and hold the wire sections in position relative to the respective grooves on the package carrier.

In a preferred embodiment of the suggestion, an element can engage against the package carrier on both sides of the package carrier, relative to the component axis, and be moved relative to the same. Due to the arrangement of one element on each of the two ends of the package carrier (for example, on the top and bottom), the respective wire section is moved from two sides, facilitating the insertion movement.

Furthermore, the package carrier and component receptacle can undergo the same—particularly synchronous— rotational movement. In the case of the synchronous rotational movement suggested here, the initially established relative position of the wire sections on the package carrier remains unchanged relative to the position of the grooves on the component. With this rotational movement, the element(s) remain(s) unchanged, so that it is possible, with this shared rotational movement, to detach the wire sections on the glide edges of the element from the package carrier, and to simultaneously push them into the grooves with the radial movement.

In an advantageous embodiment, the package carrier has a base body with a plurality of retaining bars arranged on the circumference thereof, wherein the retaining bars are provided for retaining the wire sections, and the individual retaining bars are each held on the base body with articulation at articulation points. The base body is preferably rotationally symmetric in design—without the intention of limiting the suggestion thereto. The function of the base body is particularly to carry a number of retaining bars, which are the moving parts of the package carrier.

Expediently, a link lever is functionally assigned to each retaining bar, and is connected with articulation on one end to the retaining bar, and is connected with articulation on the other end to the base body. Expediently, a slot guide may also be included between the base body and the link lever, between the link lever and the retaining bar, or between the retaining bar and the base body.

In a further preferred embodiment, the package carrier has a pivot drive which acts on the retaining bar held with articulation, and can pivot the same about the articulation points. In this first variant for the design of a radial relative movement, the pivot drive is arranged in or on the package carrier, and acts in a suitable manner at least on the retaining bars, and optionally also on the link lever. It is clear that the resulting pivot movement is to be regarded as a radial movement in the context of the invention.

Furthermore, the element can advantageously engage against the package carrier, and works together with the link levers or the retaining bars during the engagement movement. Accordingly, it can pivot the retaining bars about the articulation points. This suggestion describes a second variant for the initiation of the radial movement. The element has a conical shape, by way of example, which acts in a suitable manner on the link lever or the retaining bar, and pushes the same radially outward during the engagement movement. As a result, the initially frustoconical arrangement of the wire package on the package carrier is modified into a cylindrical arrangement, and at the same time the respective wire sections are inserted into the grooves.

According to a further possible embodiment, the invention relates to a method for the installation of a wire package, consisting of a plurality of wire windings, into a component, such as a stator or a rotor of an electrical machine, wherein the component has a plurality of grooves which run longitudinally and which are included for the purpose of receiving wire sections of the wire windings, wherein the wire package is held by a package carrier which has at least one conical section, the package carrier with the wire package is positioned on or in the component, and the package carrier is moved relative to the component while retaining the wire package, in such a manner that the conical section passes through the wire package, thereby moving at least a part of the wire package into at least one groove of the component in a radial movement relative to a component axis.

According to a possible embodiment, the package carrier has a first cylindrical section which adjoins the conical section, and a radius which corresponds to the smallest radius of the conical section, wherein the wire package is initially arranged on the first cylindrical section.

According to a possible embodiment, the package carrier has a second cylindrical section which adjoins the conical section, and a radius which corresponds to the largest radius of the conical section, wherein the wire package is arranged on the second cylindrical section after the movement into the at least one groove.

According to a possible embodiment, the package carrier has a sliding cover transport section on which a number of sliding covers are arranged, on the outside thereof, wherein, as a result of further movement of the package carrier after the movement of the wire package into the at least one groove, the sliding cover transport section brings each sliding cover into the respective grooves.

According to a possible embodiment, the sliding covers close the respective grooves after the insertion.

According to a possible embodiment, the sliding covers can be inserted by means of a separate tool.

According to a possible embodiment, the package carrier has a fin-shaped winding carrier which receives the wire windings of the wire package.

According to a possible embodiment, the respective wire section(s) of the wire package is/are simultaneously moved into several or all of the grooves, and/or the package carrier is positioned with the wire package relative to the component in such a manner that each of the wire sections is situated opposite the respective grooves which receive the wire sections before the radial movement begins.

According to a further possible embodiment, the invention relates to an apparatus for the installation of a wire package, consisting of a plurality of wire windings, into a component such as the stator or rotor of an electrical machine, wherein the apparatus has a package carrier to receive the wire package, and a conical section for expanding the wire package when it passes through the wire package, and the apparatus is designed in particular for carrying out the method according to the invention, in particular the method just described.

According to a possible embodiment, the package carrier has a first cylindrical section which adjoins the conical section, and a radius which corresponds to the smallest radius of the conical section, wherein the first cylindrical section is designed to hold the wire package before installation.

According to a possible embodiment, the package carrier has a second cylindrical section which adjoins the conical section, and a radius which corresponds to the largest radius of the conical section, wherein the second cylindrical section is designed to hold the wire package after the movement into the at least one groove.

According to a possible embodiment, a retaining tool for the wire package is functionally assigned to the package carrier.

According to a possible embodiment, the package carrier has a sliding cover transport section, which is designed to receive a number of sliding covers on the outside thereof, and which adjoins the conical section or the second cylindrical section so as to bring the sliding covers into the grooves after the installation of the wire windings, wherein a sliding cover insertion tool is preferably functionally assigned to the sliding cover transport section.

According to a possible embodiment, the package carrier has a fin-shaped winding carrier for receiving the wire windings of the wire package.

Furthermore, the invention suggests a press-insertion apparatus for pressing a wire package into a plurality of receptacles of a package carrier. The press-insertion apparatus comprises a frame which can be positioned around the package carrier. The press-insertion apparatus has a number of press-insertion elements, wherein each press-insertion element can be moved along a respective orbit path, and wherein each press-insertion element is fixed on the frame in a manner allowing radial displacement. In addition, the press-insertion apparatus has a number of push-in elements, wherein one push-in element is functionally assigned to each press-insertion element, and is designed to move the respective press-insertion element radially in the direction of the package carrier such that the press-insertion element presses the wire package further into the respective receptacle.

Alternatively, the press-insertion apparatus is intended for pressing a wire package into a plurality of receptacles of a package carrier, wherein the press-insertion device has the following:
- a frame which can be positioned around the package carrier,
- a number of push-in elements which each carry a plurality of press-insertion elements, designed to move each press-insertion element radially in the direction of the package carrier such that the press-insertion element presses at least a portion of the wire package into the respective receptacle.

By means of the press-insertion apparatus according to the invention, a wire package which is placed on a package carrier can be pressed-in in a particularly advantageous manner—and can thus particularly be compressed. This facilitates the subsequent insertion into a component such as a stator or rotor of an electromagnet. In addition, the compression enables the inclusion of a maximum number of wire windings in a given space.

The two alternative press-insertion apparatuses according to the invention, described above, differ slightly in the structural design thereof.

In the variant described first, one push-in element is functionally assigned to each press-insertion element, and/or one press-insertion element is functionally assigned to each insertion element. As such, one press-insertion element pushes the respective wire sections of the wire package for a plurality of grooves into the same.

In the second variant, the push-in element carries a plurality of press-insertion elements, wherein the same can also be designated as slides, by way of example, each of which only insert the wire section of the wire winding for one groove into the same.

Of course, it is possible to provide intermediate forms between these two variants.

The frame can advantageously be circular in shape.

The frame can preferably be positioned relative to the package carrier in such a manner that the package carrier is arranged centrally and/or coaxially to the frame.

The press-insertion elements are each designed according to one embodiment as circulating belts.

Each belt can in this case particularly circulate around a plurality of—preferably—three gears.

Preferably in this case, two radially-inner gears define each of the contact surfaces of the press-insertion element on the package carrier and/or the wire package.

Preferably, the radially-inner gears are designed to allow radial displacement relative to a central axis along displacement paths, wherein the package carrier can be positioned coaxially with the central axis.

Each of the press-insertion elements can preferably be driven by its own drive—in particular, driven rotationally. As such, they can be synchronized with a rotational movement of the frame relative to the package carrier, by way of example, as will be described in more detail below.

The radially-inner gears are preferably grouped into pairs of two, wherein the respective gears of each pair of two can be synchronously displaced via a shared push-in element. This enables easy operation and an even press-insertion along a circumference of a package carrier.

The press-insertion elements designed as belts can preferably be driven rotationally.

Each of the radially-inner gears can preferably be moved by link levers of each respective push-in element along the displacement paths—in particular, in pairs.

According to a preferred embodiment, the frame is designed to rotate relative to the package carrier during the press-insertion. This allows a particularly effective press-insertion.

The press-insertion apparatus can particularly have a frame drive for moving the frame rotationally relative to the package carrier.

The frame drive in this case is preferably synchronized with the respective press-insertion elements, such that the respective belts on the package carrier remain stationary around the circumference.

Each of the displacement paths are expediently prespecified by respective guide rails constructed on the frame.

According to a preferred embodiment, the press-insertion apparatus has a number of further press-insertion elements, which are arranged mirror-inverted to the press-insertion elements with respect to a mirror plane, and which are designed functionally corresponding to the press-insertion elements. This can particularly mean that components which are connected to the press-insertion elements are also accordingly present on both sides of the mirror plane, and can also particularly be mirror-inverted and/or mirror-symmetrical to each other. For example, these can be the push-in elements.

According to an advantageous embodiment, the press-insertion apparatus further comprises a first set of holding-down devices which are arranged next to the press-insertion elements and which are designed to hold down the wire package on the package carrier—in particular, during the press-insertion. In this way, the compression of the wire package can be supported and/or maintained.

The press-insertion apparatus expediently further comprises a first set of compression tools to which the holding-down devices of the first set can be attached, and by means of which the holding-down devices can be pressed in the direction of the wire package. This enables a simple operation and/or actuation of the holding-down device.

The press-insertion apparatus preferably further comprises a second set of holding-down devices, which is arranged next to the press-insertion elements or the further press-insertion elements, and which is designed to hold down the wire package on the package carrier—in particular, during the press-insertion.

The press-insertion apparatus preferably further comprises a second set of compression tools to which the holding-down devices of the second set can be attached, and by means of which the holding-down devices can be pressed in the direction of the wire package.

The holding-down devices at least of the first and/or the second set are preferably designed to be temporarily locked to the package carrier.

Furthermore, the invention suggests a package carrier for inserting a wire package into a component—in particular, a stator or a rotor of an electric motor. The package carrier has a press-insertion mandrel which extends along an axis. The package carrier has a number of fins which can be adjusted radially. These protrude radially, at least when extended, from the press-insertion mandrel, wherein a receptacle for a portion of the wire package is formed between each pair of two circumferentially adjacent fins. The package carrier has an actuating device which is designed to radially retract and extend the fins. The package carrier further has a displacement device which is designed to move the fins along the axis.

Such a package carrier has proved to be particularly advantageous for the insertion of a wire package into a component. In particular, it can be used to carry out a method described herein.

The press-insertion mandrel expediently has, at least partially, or in a conical section, a conical shape, which widens along the axis. This can be used advantageously for inserting the wire package into a component.

Preferably, the press-insertion mandrel is radially symmetric with respect to the axis. This enables a simple design and corresponds to the typical design of components which are relevant here.

The actuating device can particularly have a pneumatic or hydraulic design.

The actuating device can particularly have a piston with an outer and inner cone for pushing out the fins. Such a design has proven itself for typical applications.

The package carrier preferably has a locking mechanism for the releasable and/or temporary locking of holding-down devices of a press-insertion apparatus for press-insertion of a wire package.

This enables an advantageous cooperation with the aforementioned holding-down devices.

The package carrier is preferably designed for cooperation with a press-insertion apparatus as described above. In this context, all of the designs and variants described above can be applied.

Furthermore, the invention suggests a method for pressing a wire package into a plurality of receptacles of a package carrier, wherein the method has the following steps:
furnishing the package carrier, wherein the wire package is received in the receptacles,
inserting the package carrier into a press-insertion apparatus for press-insertion of the wire package,
moving press-insertion elements of the press-insertion apparatus in the direction of the package carrier, such that the press-insertion elements press-in the wire package.

This method can preferably be used to press a wire package into a package carrier, which achieves the advantages mentioned above.

The press-insertion apparatus in this case is preferably a press-insertion apparatus as described above. In this context, all of the designs and variants described above can be applied.

The package carrier is preferably a package carrier as described above. In this context, all of the designs and variants described above can be applied.

The package carrier and press-insertion apparatus are preferably rotated relative to each other during the method. It has been recognized that this approach leads to a particularly good press-insertion effect.

The wire package is preferably wound on the press-insertion mandrel, such that it is received in the receptacles.

Prior to the winding of the wire package, groove insulation is preferably inserted into the receptacles, such that it is arranged between the wire package and the press-insertion mandrel when the wire package is received in the receptacles. This advantageously results in a good insulation between the wire package and the package carrier and/or, upon insertion of the groove insulation into the component, also between the wire package and the component.

In addition, damage can be avoided during insertion, since the groove insulation can advantageously cover edges, bumps and other possible sources of damage.

The groove insulation can particularly be insulation paper.

The groove insulation can be cut open and/or glued, in particular after the wire package is received.

The press-insertion mandrel can preferably have a first region and a second region along the axis, wherein the first region has a smaller diameter than the second region, and a conical region is arranged between the first region and the second region. This enables a press-insertion of the wire package into a component by the movement of the package carrier relative to the wire package.

The wire package is preferably wound on the second region of the press-insertion mandrel.

The wire package is preferably pressed-in on the first region of the press-insertion mandrel.

The wire package is preferably held down during the press-insertion by a number of holding-down devices of the press-insertion apparatus.

The wire package can also be held down on both axial ends by a number of holding-down devices during the press-insertion and/or after the press-insertion.

After the press-insertion, holding-down devices can be locked on the package carrier, particularly on one axial end thereof, and compression tools assigned to the holding-down devices can be withdrawn, such that the wire package is accessible on one axial end.

After the locking on one end, a component into which the wire package will be inserted is arranged radially outside of the wire package, said arrangement preferably proceeding from the accessible side.

The package carrier can be moved, while the wire package is retained, in particular after the arrangement of the component, such that the wire package is inserted into the component—in particular, in grooves of the component—due to an increase in the diameter of the package carrier.

Before the insertion of the wire package into the component, locked holding-down devices can be released.

During the insertion of the wire package into the component, holding-down devices can remain on the wire package, and can particularly also be radially displaceable. These holding-down devices can stabilize the wire package, particular axially, such that it is inserted into a component due to the widening diameter.

After the insertion of the wire package, the component can be removed from the package carrier, in particular over the first region.

It should be understood that the method described herein can be extended by means of at least some of the steps described herein to create a method which serves the purpose of inserting a wire package into a component, particularly a stator or a rotor of an electric motor.

In this context, it is hereby particularly noted that all the features and characteristics described in relation to the apparatus—as well as procedures—can be applied mutatis mutandis, with respect to the formulation of the inventive method, and can be used for the purposes of the invention, and are also disclosed as such herein. The same also applies in the opposite direction—that is, structural and/or apparatus-related features only mentioned in relation to the method can also be incorporated and claimed within the scope of the apparatus claims, and are also included in the disclosure.

BRIEF DESCRIPTION OF THE DRAWINGS

In the drawing, the invention is particularly shown schematically in one embodiment, wherein:

FIG. 1 comprises;

FIG. 3 comprises;

FIGS. 3A and 3B, position 2: FIG. 3C and FIG. 3D, and position 3: FIGS. 3E and 3F) in a second embodiment of the method according to the invention;

DETAILED DESCRIPTION OF THE DRAWINGS

Figure 1A:
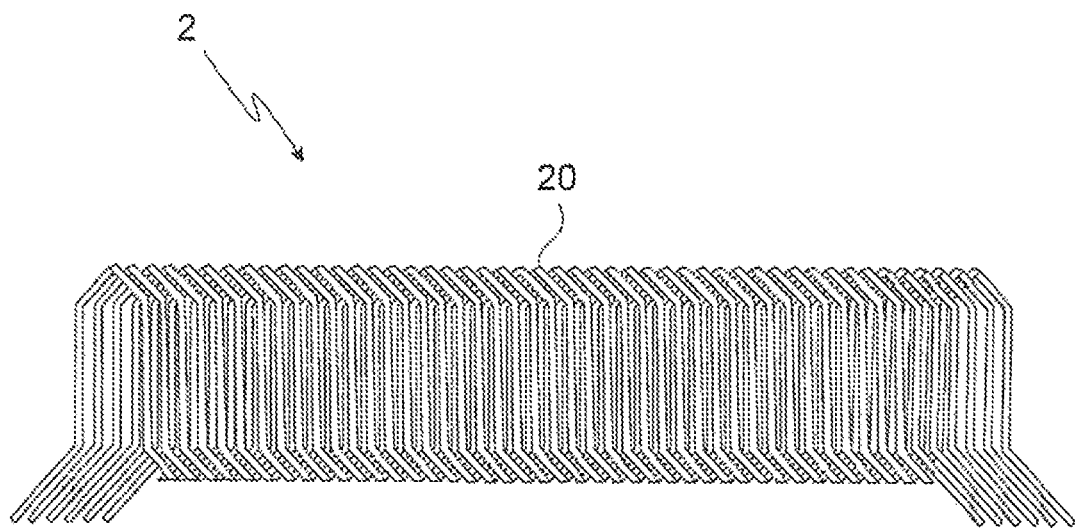
FIG. 1A: which shows, in a three-dimensional view, a wire package for installation.

In the figures, the same elements, or those which correspond to each other, are denoted by the same reference numerals and are therefore not described again unless necessary. The disclosures contained in the entire description can be applied mutatis mutandis to the same parts with the same reference numerals and/or the same component names. Also, the location information selected in the description—such as above, below, laterally, etc.—refers to the figure presently described and illustrated, and is to be transferred analogously to a new orientation in the event that the orientation changes. Furthermore, individual features or combinations of features from the different embodiments illustrated and described can also represent separate, inventive solutions or solutions according to the invention.

In FIG. 1A, the wire package 2 is shown in a schematic view. The wire package 2 consists of a plurality of wire windings 20, which consist of wire sections 21 which run in straight lines, and gable-shaped connectors 25 which connect the individual wire sections 21 to each other. It should be noted that the wire package 2 consists of six independent lines 29, for a total of six available poles. The number 28 marks the respective line ends, which also provide electrical connection options.

Figure 1B:
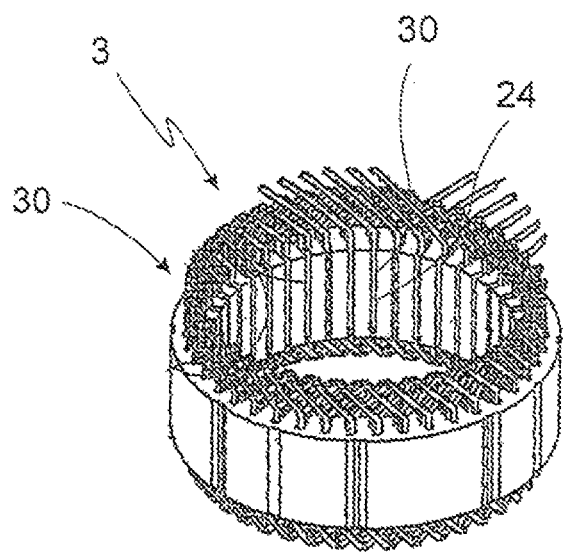
FIG. 1B: which shows, in a three-dimensional view, a wire package installed in the stator of an electric motor.

FIG. 1B shows a component 3—in this case, a stator 30—in which the wire package 2 of FIG. 1a is already installed. In this installation state of the wire package 2, the same describes a cylindrical or circular arrangement 24. The term cylindrical arrangement refers to the outer contour of the installed wire package 2, wherein the straight wire sections 21 are inserted into grooves 31 of the stator 30.

Figure 2A:
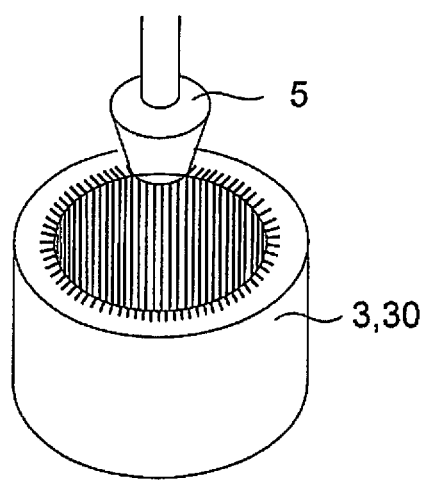
FIG. 2A: which shows, in a three-dimensional view, the installation of a wire package into a component according to a first embodiment of the method according to the invention.
Figure 2B:
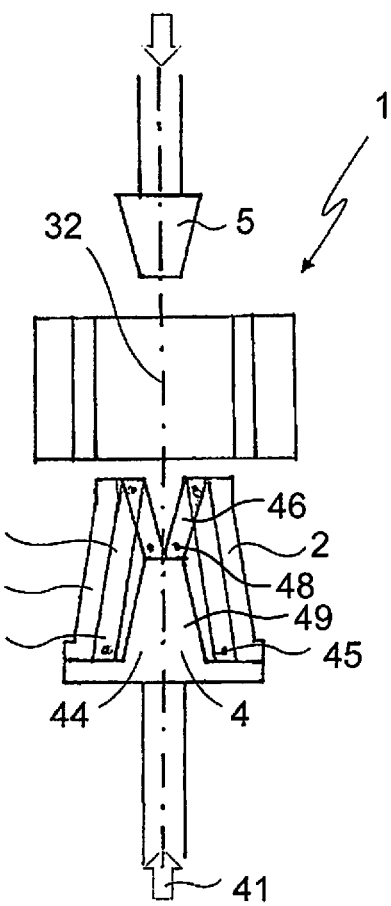
FIG. 2B: which shows, in a side view, a first position in the method according to the invention, according to FIG. 2A, and FIG. 2C: which shows, in a side view, a first position in the method according to the invention, according to FIG. 2A.
Figure 2C:
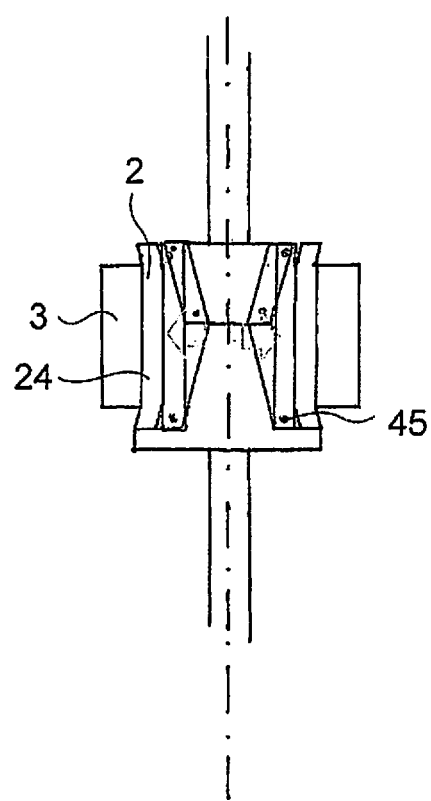
FIG. 2 comprises.

FIG. 2B and FIG. 2C show a schematic view of a first embodiment of the method according to the invention. The package carrier 4 which can (optionally) rotate around the component axis 32 carries a wire package 2, which is arranged in this case in a frustoconical 23 configuration. In FIG. 2A, this frustoconical configuration 23 can be seen clearly at bottom on the package carrier 4.

The package carrier 4 is, relative to the component axis 32, moved axially (see arrow 41) upward to insert the frustoconical wire package 2, 23 into the inside 33 of the stator 3, 30. Of course, the same can also be achieved by a lowering movement of the stator 30 and/or component 3 downwards while the package carrier 4 is stationary.

The package carrier 4 consists of a base body 44 which has a rotationally symmetric basic structure and a central mandrel 49. On the upper end of the mandrel 49, a number of link levers 46, which in this case are articulated (see articulation axes 48) are connected to the main body 44, close to the component axis 32.

The frustoconical wire package 2, 23 is supported in this position by a series of retaining bars 42, which are articulated on one end via respective articulation points 45 on the base body 44, and are connected to the respective link levers 46 with articulation on their upper ends, remote from the articulation points 45, via an articulation guide 47.

At this point, the wire package 2 is initially positioned within the component 3 and/or the stator 30 in such a manner that each wire section 21 is positioned opposite its respective groove 31. This guidance function is made easier by the base of the frustoconical wire package 2, 23 being slightly wider than the inner diameter of the stator 30. This means that the axial ends or the axial edge (relative to the component axis) of the wire package 2 are guided and/or captured by the groove walls of the respective grooves 31 when the package carrier 4 is retracted into the interior 33 of the stator 3, and are accordingly brought into alignment at this point.

In the next step, the advancing movement of the element 5 is performed in an engagement movement 51 which is preferably performed parallel to the component axis 32. The element 5 is designed in this case as a cone (wherein the smaller diameter thereof is at bottom/facing the component 3) and, when the element 5 is completely inserted into the interior 33 of the stator 30, cooperates with the link lever 46 and forces the same apart. This spreading movement is directed, relative to the component axis 32, radially.

This is shown in FIG. 2C, which also illustrates how the frustoconical arrangement 23 of the wire package 2 is repositioned into a cylindrical or circular arrangement 24. At the same time, the wire package 2 slides into the grooves 31 along the entire height of the same.

The sequence of figures in FIGS. 3A, 38, 3C, 3D, 3E and 3F shows, in various positions, different states of the manufacturing process according to a second variant of the method according to the invention.

Figure 3A:
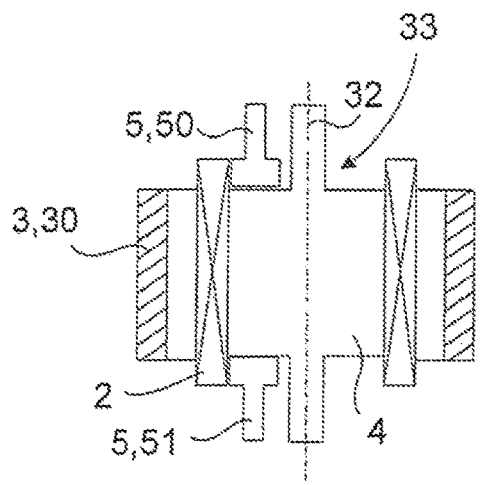
FIGS. 3A, 3B, 3C, 3D, 3E and 3F: each show, in a sectional view (FIG. 3A, 3C, 3E) or in a plan view (FIGS. 3B, 3D and 3F) different positions (position 1.
Figure 3B:
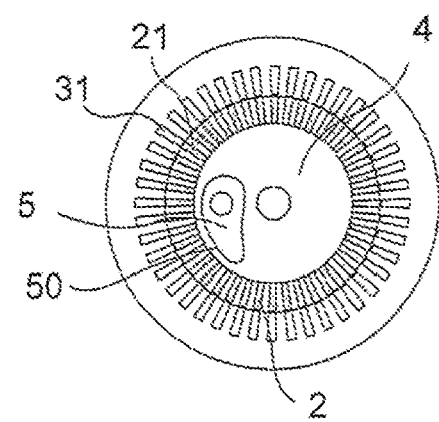

The initial state shown here in position 1 (FIGS. 3A and 3B) is preceded by the following steps. The package carrier 4 in the embodiment shown here is cylindrical in design and carries the wire package 2 on its outer surface, which in turn is also circular and/or cylindrical in shape. The package carrier 4 has already been lowered into the component interior 33, and each of the wire sections 21 is opposite its respective groove 31, as can be seen in particular very well in the plan view of FIG. 38. From both above and from below, one element 5 has already been brought into engagement with the package carrier 4, each of the same equipped with a glide edge 50. After they are engaged, they are initially moved outward in a radial movement 22 (see FIG. 3D) in the direction of the component 3.

Figure 3C:
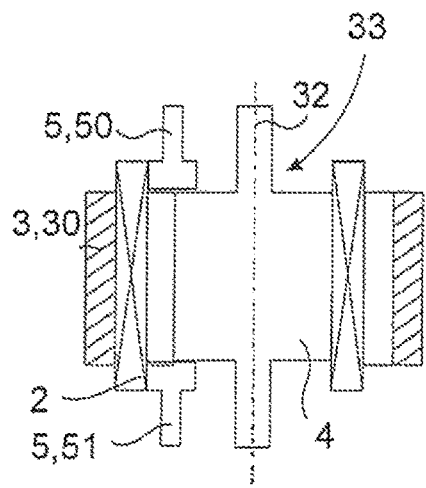
Figure 3D:
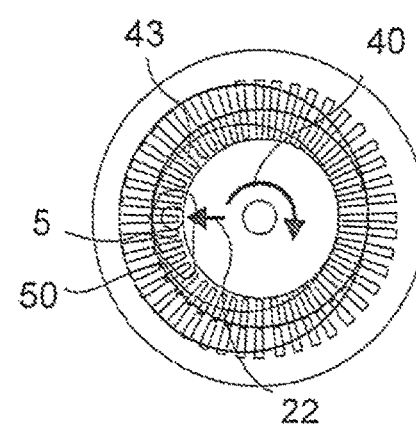
Figure 3E:
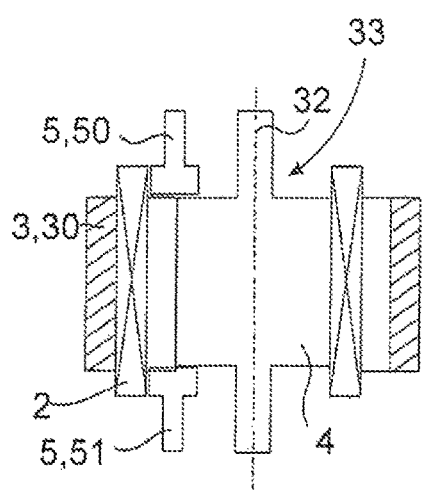
Figure 3F:
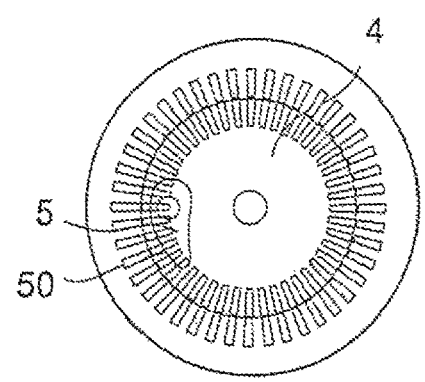

FIGS. 3C and 3D describe position 2—the press-insertion process. During this radial movement 22, the wire sections 21 are partially inserted into the grooves 31. Prior to this, the wire sections held on the package carrier 4 are pushed out of the holding element 43, which has a slot-like design, by way of example. Expediently, each of the wire sections 21 are always guided accordingly, either by the holding elements 43 or by the grooves 31. The insertion movement for the wire sections 21 occurs in this case via the glide edge 50, which is spiral in form relative to the component axis 32, with a radius which increases in the clockwise direction.

After the first portion of the wire package 2 has been inserted into the respective grooves 31, the component 3 and wire package 2 (and/or the package carrier 4) undergo a rotational movement 40 together about the (shared) component axis 32. The element 5 is stationary in this case. The rotational movement 40 in this case is also in the clockwise direction, such that wire sections 21 held on the package carrier 4 are continuously advanced toward the element 5 and then moved via the glide edge 50 into the respective grooves 31, moving synchronously with the package carrier 4, of the component 3 and/or stator 30.

After a 360° rotation of the package carrier 4 and component 3 arrangement about the component axis 32, the entire wire package 2 is detached from the package carrier 4 and installed into the component 3, and/or inserted into the grooves 31. This completes the installation.

Figure 4:
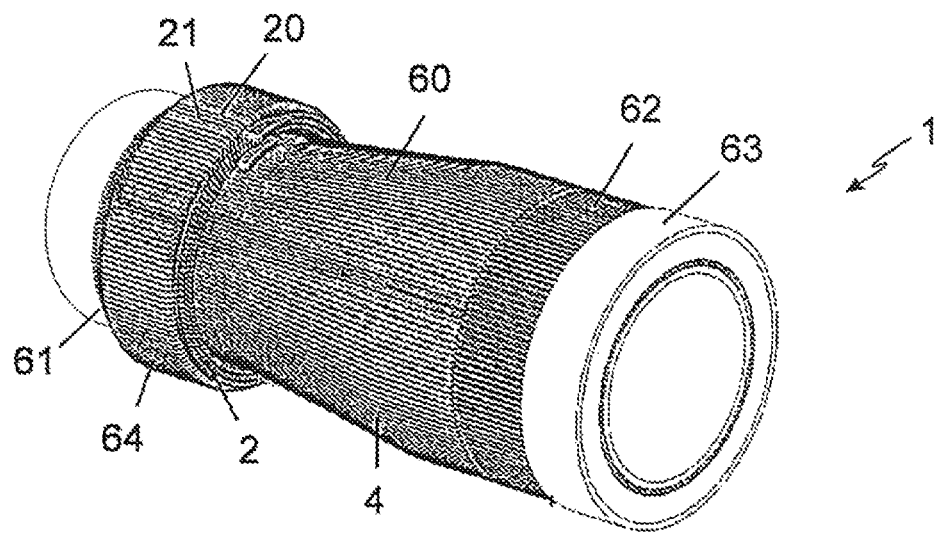
FIG. 4 shows, in a perspective view, an apparatus for installing a wire package.

FIG. 4 shows an alternative apparatus 1, which can be used for carrying out an alternative embodiment of the method according to the invention.

The apparatus 1 has a package carrier 4. The package carrier 4 has a conical section 60 which is arranged centrally in the package carrier 4 along a longitudinal extension, and in which a radius of the package carrier 4 continuously expands.

A first cylindrical section 61, which has a constant radius, adjoins the conical section 60 on the left. The radius of the first cylindrical section 61 in this case is exactly as large as the smallest radius of the conical section 60.

A second cylindrical section 62, which has a constant radius, adjoins the conical section 60 on the right. The radius of the second cylindrical section 62 is exactly as large as the largest radius of the conical section 60.

A sliding cover transport section 63 then adjoins the second cylindrical section 62 on the right. In the present case, this also has the same radius as the second cylindrical section 62. It thus forms an immediate extension of the second cylindrical section 62.

In the state shown in FIG. 4, a winding carrier 64 is arranged on the left end of the package carrier 4, surrounding the first cylindrical section 61. The winding carrier 64 is designed to receive a wire package 2 which will be inserted into a component such as a stator or a rotor of an electrical machine.

The wire package 2 is also shown in FIG. 4. It has a plurality of wire windings 20, each with respective wire sections 21. This is a typical winding for an electric motor, in particular a powerful electric motor as used in an electric vehicle or a hybrid vehicle, by way of example.

Figure 5:
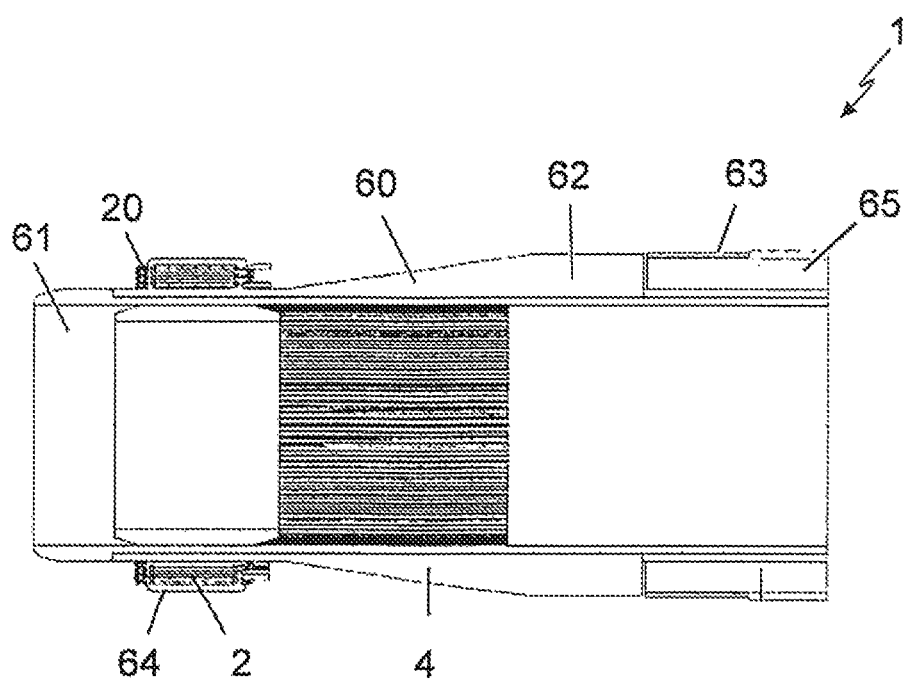
FIGS. 5, 6 and 7 show, in a sectional view, different states during a method for installing a wire package.

FIG. 5 illustrates the same state as that shown in FIG. 4.

However, FIG. 5 is a lateral sectional view rather than a perspective view. With regard to the components shown, reference is hereby largely made to the description of FIG. 4.

Furthermore, FIG. 5 shows that a number of sliding covers 65 are attached in the sliding cover transport section 63, and these sliding covers 65 are arranged radially on the outside. These sliding covers 65 are designed to close and/or cover each of the grooves after the wire package 2 has been inserted into the respective grooves. The closing and/or covering in this case particularly occurs with respect to a radially-inner interior of the component or stator.

The way in which the insertion of the wire package 2 into the component 3 occurs will now be shown and described with reference to FIGS. 6 and 7. In the present case, the component 3 is a stator of an electric motor. Such an electric motor can particularly be intended for applications in which high performance and long service lives are required—for example, in electrically powered vehicles.

Figure 6:
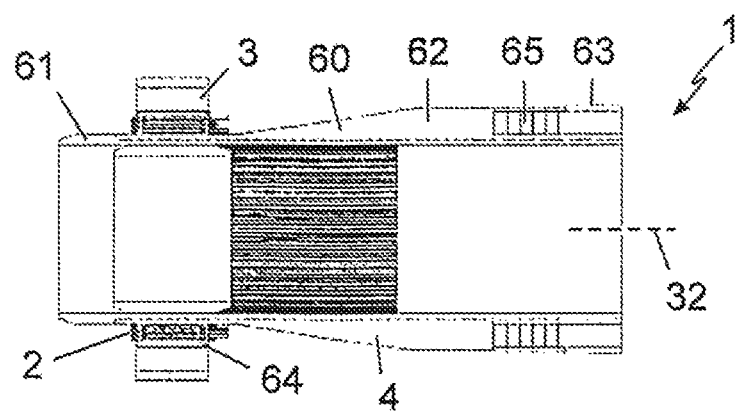
Figure 7:
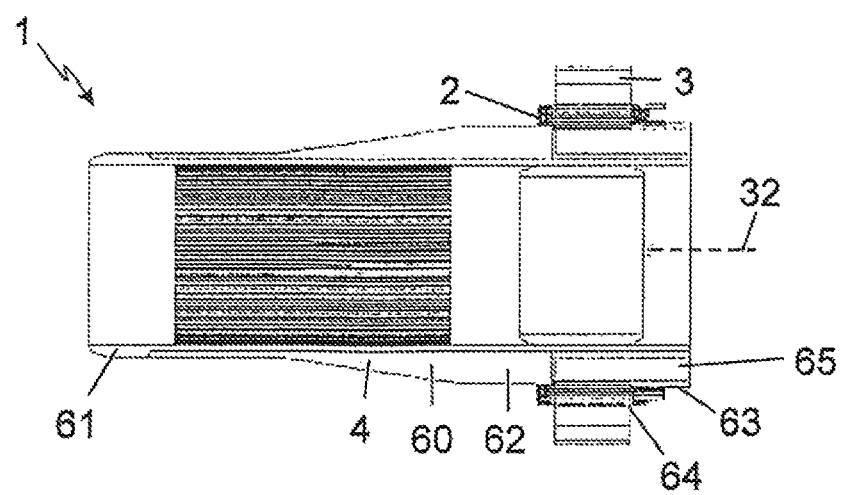

In the state shown in FIG. 6, the wire package 2 has been inserted into the component 3, such that the wire package 2 is situated directly in the component 3. Starting from this state, the package carrier 4 can now be moved to the left. The wire package 2 remains in the winding carrier 64 and is held in the same axial position such that it does not move axially relative to the component 3.

The package carrier 4 moves parallel to a component axis 32 and/or axis of symmetry of the component 3. This component axis 32 is included in FIG. 6. This also defines the term 'axial movement'.

If, under the conditions shown—that is, particularly when the wire package 2 is retained—the package carrier 4 moves to the left, the result is that the wire package 2 is no longer engaged with the first cylindrical section 61 of the package carrier 4. Rather, it passes onto the conical section 60 of the package carrier 4. As already described above, the radius of the package carrier 4 increases in the conical section 60, such that the described movement of the package carrier 4 to the left likewise increases the radius of the respective part of the package carrier 4 which the wire package 2 contacts. As a result, the wire package 2 expands radially.

As a result of the radial expansion of the wire package 2 just described, the wire windings 20 and/or wire sections 21 of the wire package 2 are pressed into the respective grooves of the component 3. It should be understood that the wire windings 20 and wire sections 21 of the wire package 2 have already been previously arranged for this purpose in such a manner that they can lie opposite their respective grooves of the component 3, and are inserted into the grooves without any further displacement along the circumference of the wire package 2.

If the package carrier 4 moves further to the left, the wire package 2 is no longer adjacent to the conical section 60. Rather, it is adjacent to the second cylindrical section 62. At this point, the wire package 2 has reached its greatest radial expansion. In this state, it is situated into the grooves of the component 3, as can be seen in FIG. 7.

Subsequently, the package carrier 4 is moved even further to the left, such that the wire package 2 and the component 3 are arranged next to the sliding cover transport section 63. This is illustrated in FIG. 7. The sliding covers 65 can be inserted axially into the grooves of the component 3. The sliding covers 65 in this case are particularly inserted in such a manner that they close and cover the grooves towards the inside. Thus, the wire windings 20 and/or wire sections 21 of the wire package 2 are particularly protected from possible mechanical damage—for example in subsequent processing steps.

It should be understood that grooves and/or guide rails can be attached in the axial direction on the conical section 60 of the package carrier 4, as is indicated in the figures. These can guide and/or stabilize the wire package 2 and/or the winding carrier 64, for example.

The embodiment which has been presented with reference to FIGS. 4 to 7 differs both with respect to the method aspects as well as with respect to the apparatus aspects from the versions illustrated with reference to FIGS. 1 to 3. However, the goal of reliably and efficiently bringing a wire package 2 into grooves of a component 3, such as a stator of an electric motor, and optionally closing the grooves with sliding covers, is likewise achieved in this embodiment.

Figure 8:
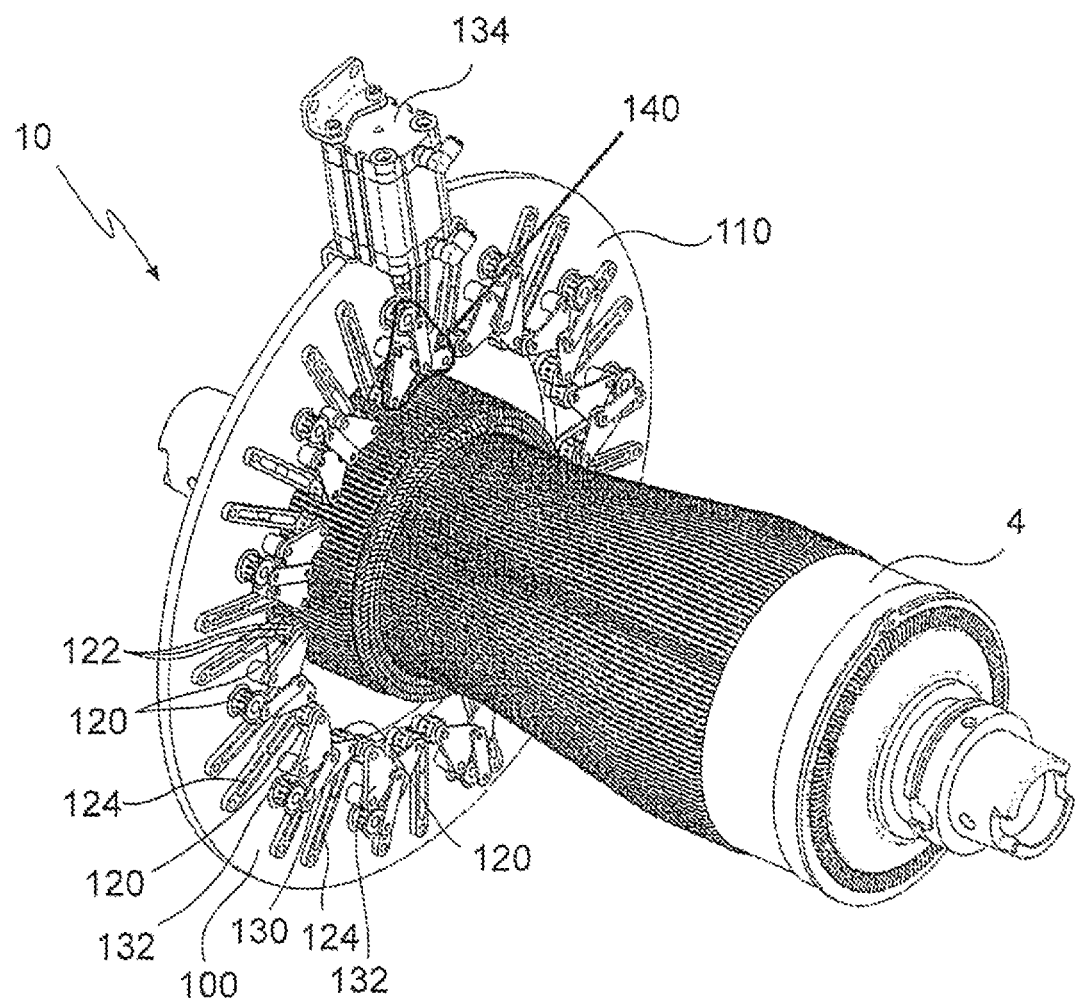
FIG. 8: shows an arrangement having an apparatus for press-insertion (press-insertion apparatus), and having a package carrier according to the invention.

FIG. 8 shows an arrangement 10, having an apparatus 100 for the press-insertion of a wire package, and/or a press-insertion apparatus 100, and having a package carrier 4. Both the apparatus 100 and the package carrier 4 each represent embodiments of the invention in the depictions.

It should be understood that FIGS. 8 to 19 show embodiments of the invention which are generally described mostly independently of the previous embodiments. However, they can be combined in any manner with the previously described embodiments either completely or just with respect to individual features.

The apparatus 100 has a frame 110. The frame 110 is designed in the present case in the form of a ring. On the frame 110, the other elements of the apparatus 100 are mounted. These are described below.

The apparatus 100 has a number of press-insertion elements 140. These are designed in the form of belts in this case. The belts each run around a total of three gears 120, of which two are in a radially-inner position, and thus define a contact surface of the belt and/or of the press-insertion element 140 on the package carrier 4. Each gear 120 has a number of projections 122 which are formed as teeth of the gears 120. These teeth engage with the belt and/or press-insertion element 140.

One gear 120 per belt is in a radially-outer position. In particular, it defines a path along which the respective belt circulates.

The radially-inner gears 120 are arranged in groups of two as shown. In each case, the two gears 120 of each group of two can be moved together, as will be described in more detail below.

Each radially-inner gear 120 can be displaced along its own displacement path 124. The displacement paths 124 are linear and oriented radially with respect to the same center axis, which also represents a center axis of the frame 110 and the apparatus 100. The press-insertion elements 140 are thus radially displaceable.

The apparatus 100 further comprises a number of push-in elements 130. Each push-in element 130 is functionally assigned to two radially-inner gears 120.

The push-in elements 130 are designed to move the gears 120 to which they are assigned along the respective displacement paths 124. For this purpose, the push-in elements 130 each have link levers 132, each link lever 132 being connected in each case to a gear 120. If a push-in element 130 moves and/or is moved by an external mechanism 134, which is only shown once at the upper edge, wherein a separate mechanism is typically provided for each push-in element 130, then the gears 120 are moved along their respective displacement paths 124 as a result. The mechanisms 134 can particularly have a hydraulic design, and thus actuate the push-in elements 130.

The press-insertion elements 140 serve in particular to push each of the wire packages into their respective receptacles of a package carrier 4, and hence to ensure that the wire package is pressed radially inward. Exactly how this can be done is described in greater detail further below.

The arrangement 10 further comprises the aforementioned package carrier 4. This package carrier 4 will be described in more detail below. It particularly serves the purpose of initially receiving a wire package, then inserting it in an appropriate manner into a component. It should be understood, however, that the apparatus 100 shown can in principle also work together with other types of package carriers 4, and the illustrated and described embodiment is merely a preferred variant.

Figure 9:
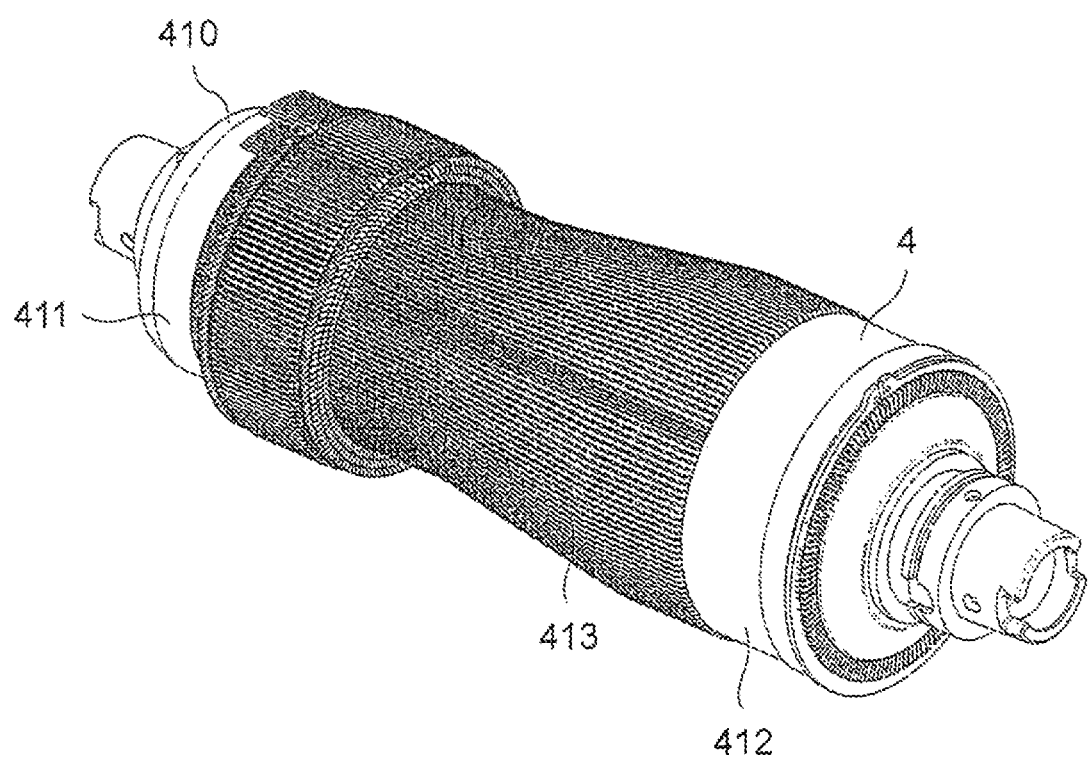
FIG. 9: shows the package carrier separately.

FIG. 9 shows the package carrier 4 separately. It can be seen that the package carrier 4 comprises a press-insertion mandrel 410 which extends along a longitudinal axis of the entire package carrier 4, and is substantially radially symmetric with respect to said longitudinal axis.

The press-insertion mandrel 410 has a first region 411 and a second region 412. As shown, the first region 411 has a smaller radius than the second region 412.

Between the two regions 411, 412, the press-insertion mandrel 410 is conical, such that the radius continuously widens along the aforementioned longitudinal axis. This defines a conical region 413 and can be exploited to insert a wire package into a component, as will be described in more detail below.

Figure 10:
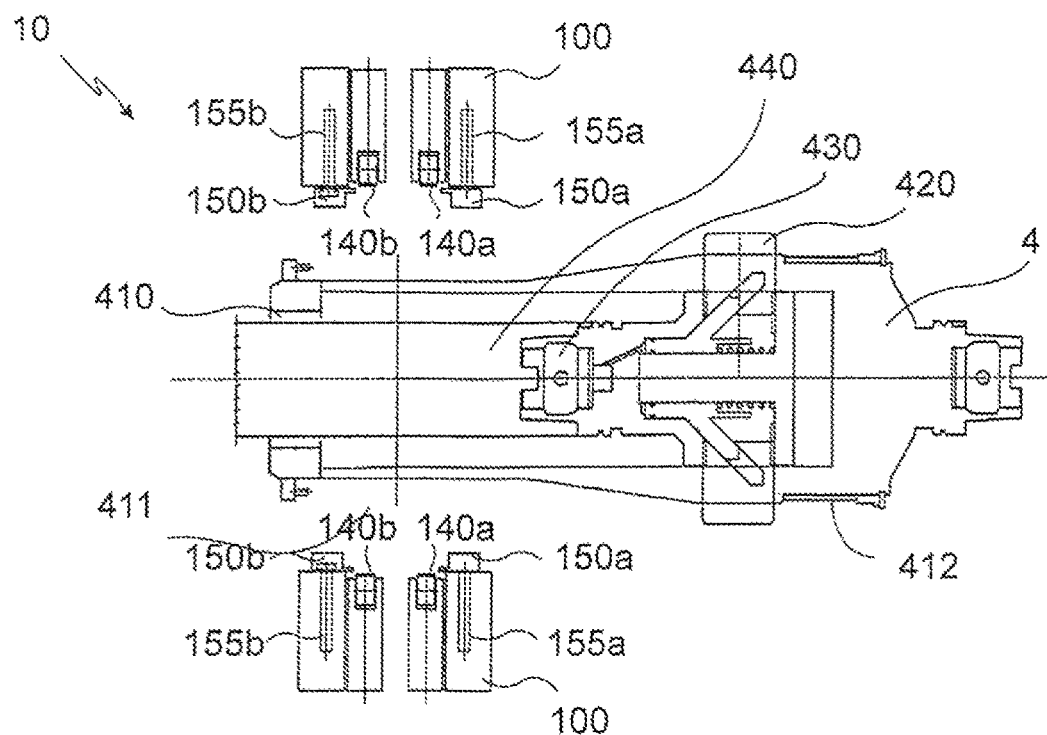
FIGS. 10 to 19: show different states in a method for press-insertion and/or for producing a component.

FIG. 10 shows an arrangement 10 with an apparatus 100 and a package carrier 4, wherein FIG. 10 is a schematic side view and, in particular, the apparatus 100 is somewhat modified compared to the embodiment of FIG. 8. This will be discussed in more detail below.

The apparatus 100 has, as already described with reference to FIG. 8, a number of press-insertion elements 140, which are designed in the form of belts. The press-insertion elements 120 in this case are divided into two groups, with a first group of press-insertion elements 140a being arranged on a right side of the apparatus 100 and a second group of press-insertion elements 140b being arranged on a left side of the apparatus 100. The press-insertion elements 140 can thus provide a pressing action over a larger expansion area.

The apparatus 100 further includes a number of holding-down devices 150 and associated compression tools 155. These are also divided into two groups, wherein a first group of holding-down devices 150a is arranged on a right side of the apparatus 100 and a second group of holding-down devices 150b is arranged on a left side of the apparatus 100. The same applies to the each of the associated compression tools 155, which are likewise divided into a first group of compression tools 155a and a second group of compression tools 155b. By means of the compression tools 155, the respective holding-down devices 150 can be pushed radially inward, such that they can produce an effect as described with reference to other figures.

FIG. 10 also shows further details of the package carrier 4. These are described in more detail below.

The package carrier 4 has a number of fins 420. These fins 420 protrude radially outward, as can be seen in FIG. 10. In this case, further fins 420 are present along the circumference of the package carrier 4, which cannot be seen in FIG. 10, since it is purely a sectional view.

Receptacles are formed between the fins 420 along the circumference of the package carrier 4. These cannot be seen in FIG. 10 and the other figures; however, a wire package can be inserted in a suitable manner into the same.

The package carrier 4 further comprises an actuating device 430, which is designed to radially retract and extend the fins 420. In addition, the package carrier 4 has a displacement device 440 which is designed to move the fins 420 along the longitudinal axis of the package carrier 4.

In the state shown in FIG. 10, the apparatus 100 is situated adjacent to the first region 411 of the press-insertion mandrel 410. Furthermore, the apparatus 100 is not in contact with the press-insertion mandrel 410—that is, it is radially spaced apart from the same. The manner in which the apparatus 100 and the package carrier 4 can be used to insert a wire package into a component, wherein the wire package has previously been pressed into the above-mentioned receptacles between the fins 420, will be described below with reference to the other figures. This corresponds in particular to a possible embodiment of a method according to the invention.

Figure 11:
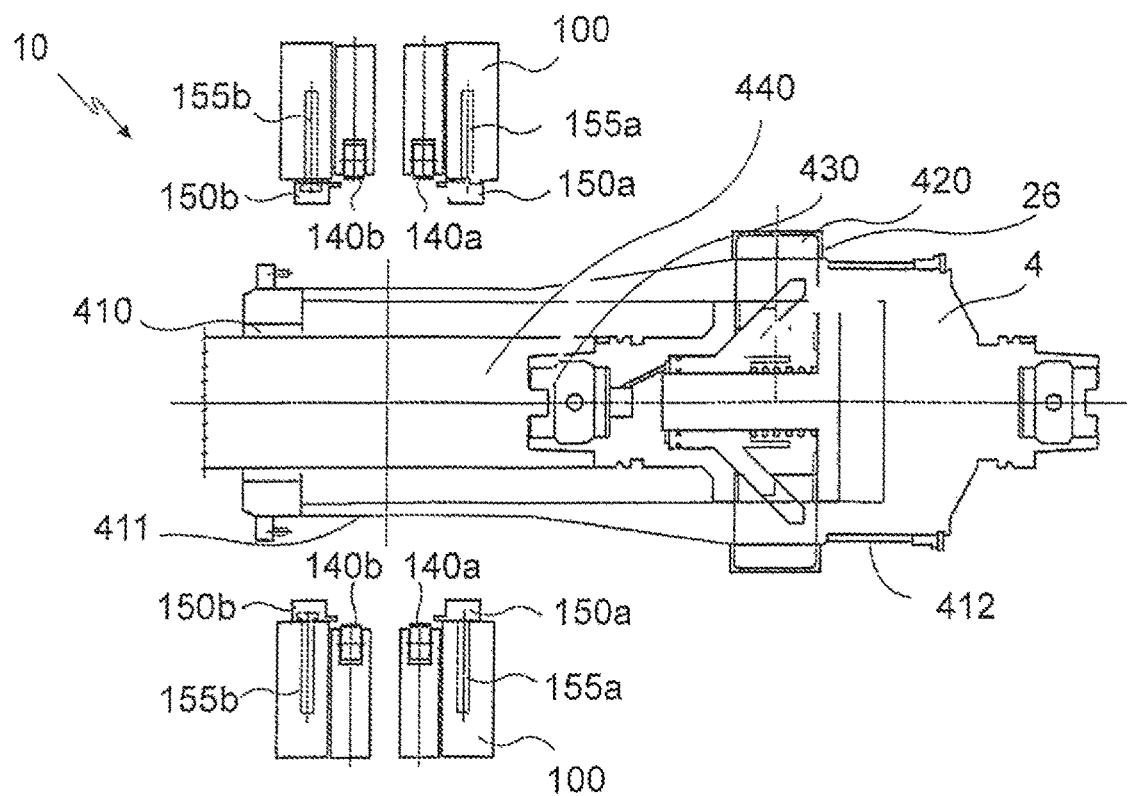

Starting from the state shown in FIG. 10, first a groove insulation 26 in the form of insulation paper is inserted into the receptacles, as can be seen in FIG. 11. In other words, the fins 420 are covered. Because of the groove insulation 26, it is possible in an advantageous manner to provide electrical insulation between the wire package and the package carrier 4, which can also be useful in addition to an existing insulation of wires of the wire package. For example, in the event of damage to an insulation of wires of the wire package, this configuration can preempt a short circuit between a wire of the wire package and other parts, such as a component, in particular a stator or rotor. For this purpose, the groove insulation 26 can also be transferred into respective grooves of such a component. In addition, the groove insulation 26 can prevent damage to the wire package during the manufacturing process.

Figure 12:
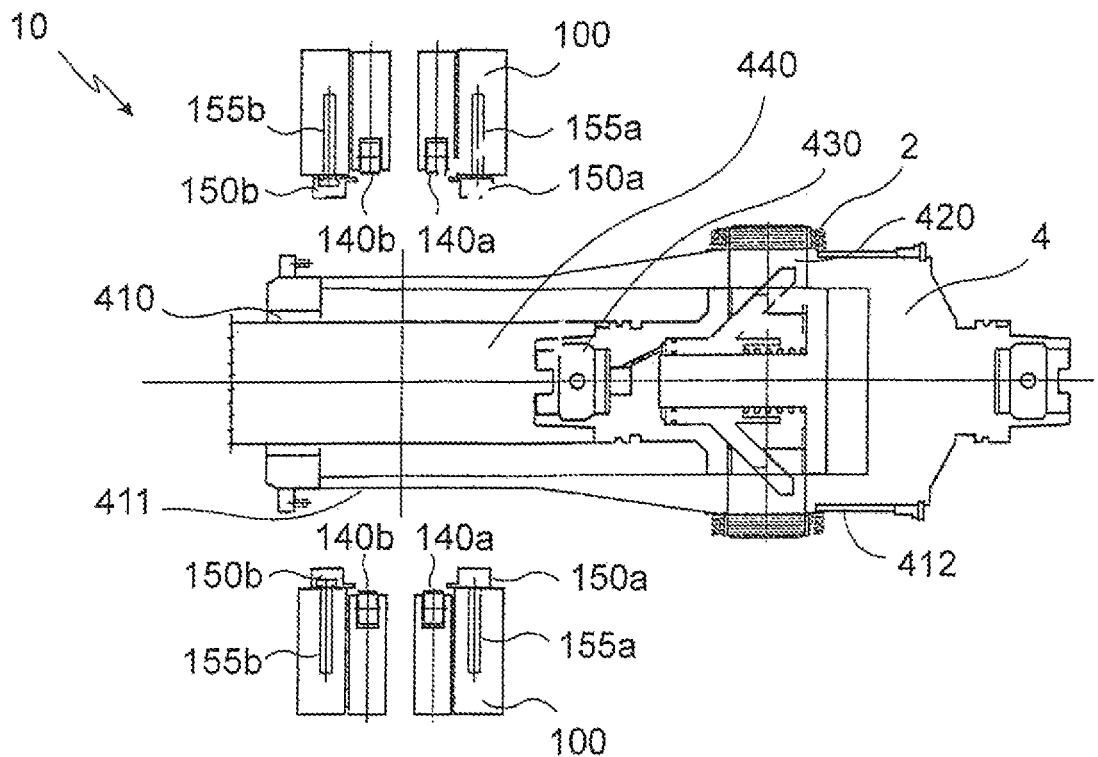

Subsequently, a wire package 2 is inserted into the receptacles formed between the fins 420. This is done by winding the wire package 2 between the fins 420, wherein the fins 420 are in an extended state. The result is shown in FIG. 12. The wire package 2 in this case has been brought into a state in which the fins 420 are situated on the second region 412 of the press-insertion mandrel 410—that is, on the region with a greater diameter.

Figure 13:
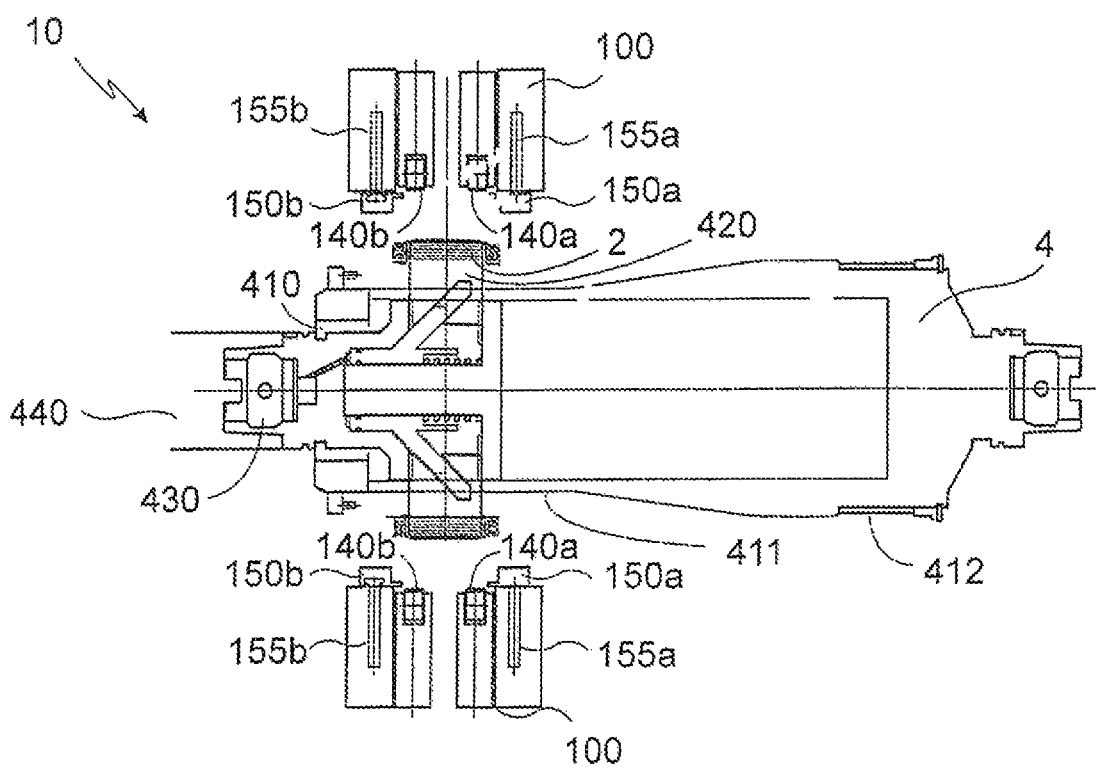

Subsequently, the fins 420 are moved together with the received wire package 2 to the left, such that they are situated on the first region 411. The resulting state is shown in FIG. 13.

Subsequently, the press-insertion elements 140 of the apparatus 100 are extended radially inwards, such that they come into contact with the wire package 2. The fins 420 are retracted radially.

As a result, the wire package 2 is pressed into the receptacles between the fins 420, and compressed. In order to achieve uniform compression, the package carrier 4 is rotated about its longitudinal axis while the apparatus 100 remains stationary, such that all the receptacles between the fins 420 come successively and repeatedly into contact with the press-insertion elements 140. Since the press-insertion elements 140 are designed as belts, they accordingly rotate as well. For this purpose, they are driven in the manner described with reference to FIG. 8. It has been shown that this approach can achieve a particularly good and uniform compression of the wire package 2 into the receptacles between the fins 420.

After the rotation compression, the holding-down devices 150 are extended—specifically via their respective compression tools 155.

Figure 14:
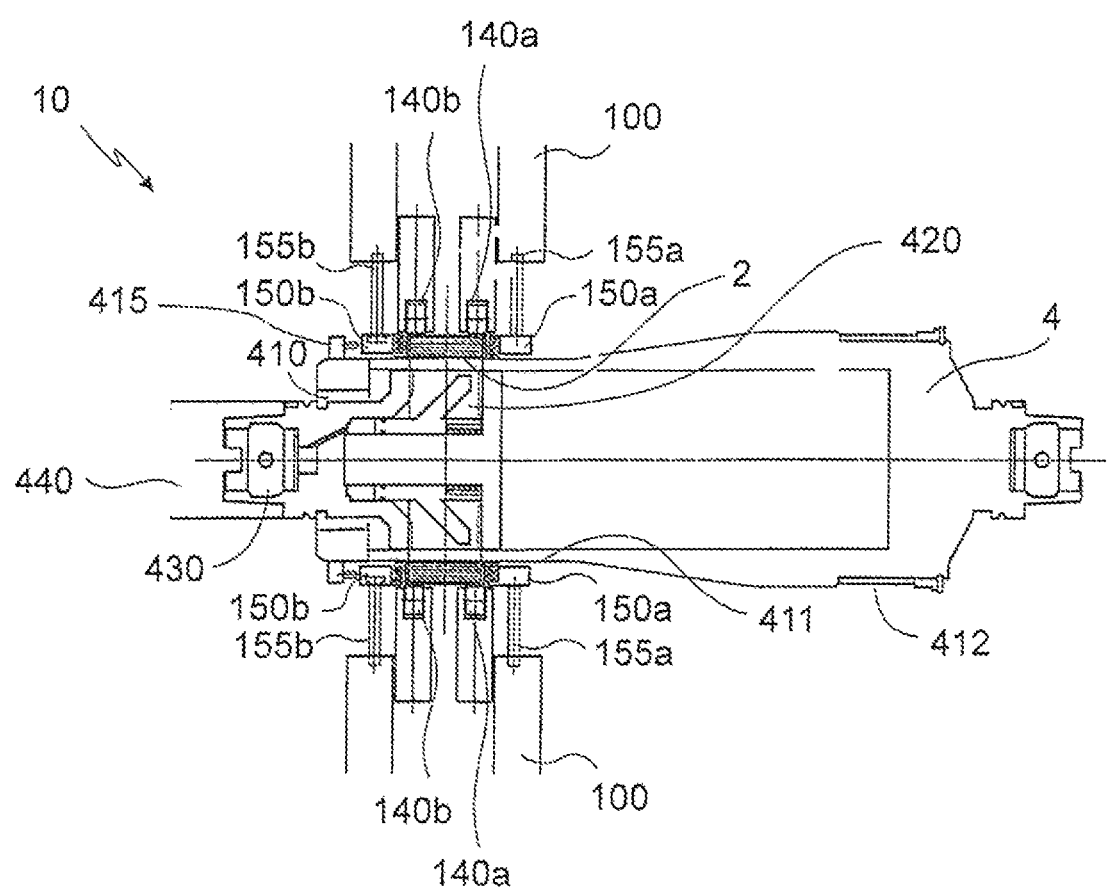

The resulting state, with the compressed wire package 2 and adjoining press-insertion elements 140, along with the adjacent holding-down devices 150, is shown in FIG. 14. It will be appreciated that the wire package 2 in this case—as far as can be seen in the schematic view—directly contacts an outer surface of the first region 411 of the press-insertion mandrel 410.

A locking device 415 is also provided on the press-insertion mandrel 410. As such, the holding-down devices 150b of the second group can be locked to the press-insertion mandrel 410. In other words, they are fixed to the press-insertion mandrel 410, such that the associated compression tools 155b of the second group can be retracted radially outward. Likewise, the press-insertion elements 140 can be retracted radially as well.

Figure 15:
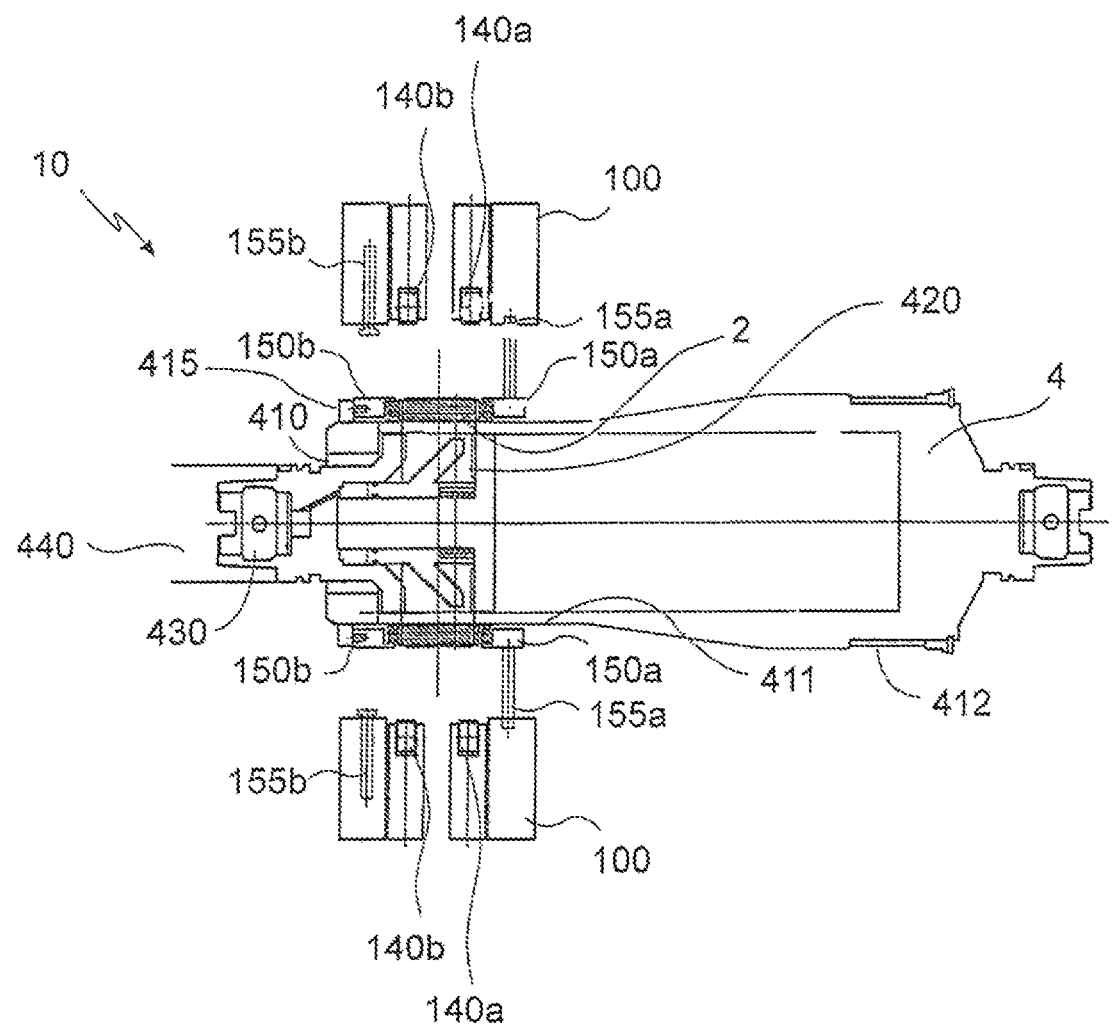

The resulting state is shown in FIG. 15. It can also be particularly appreciated that the region above and/or radially-outward with respect to the wire package 2 is now freely accessible from the left side.

Figure 16:
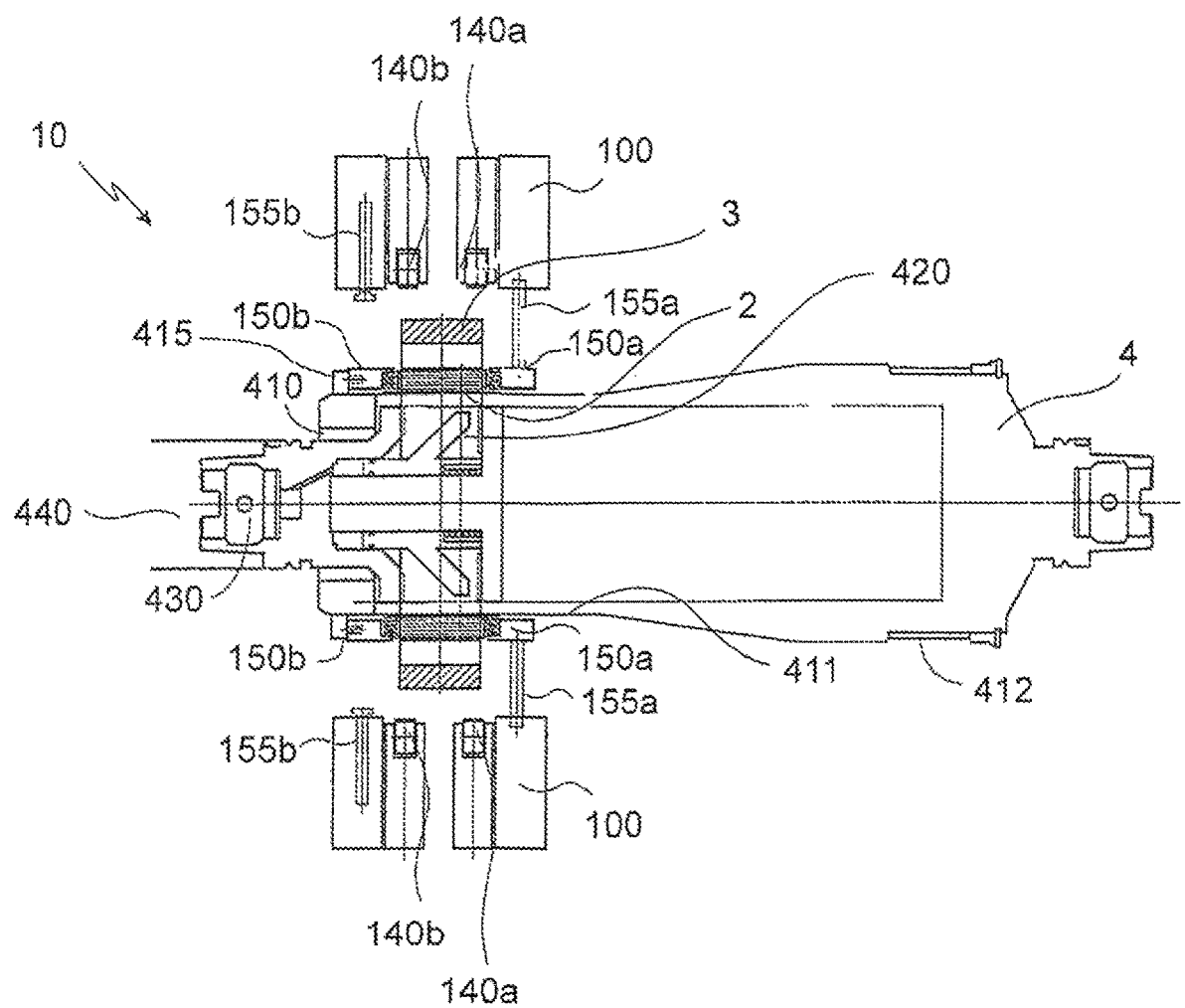

Due to this free accessibility, a component 3 can now be arranged radially outside the wire package 2. The resulting state is shown in FIG. 16. The wire package 2 is intended to be inserted into grooves of the component 3, which are not shown in detail.

The component 3 in this case extends completely around a circumference. In particular, the component 3 can be a stator or a rotor of an electric motor.

At this point, the compression tools 155b of the second group are again extended radially inward, such that the holding-down devices 150b of the second group are pressed back radially inward by the compression devices 155b. The locking mechanism 415 can thus be released again.

Figure 17:
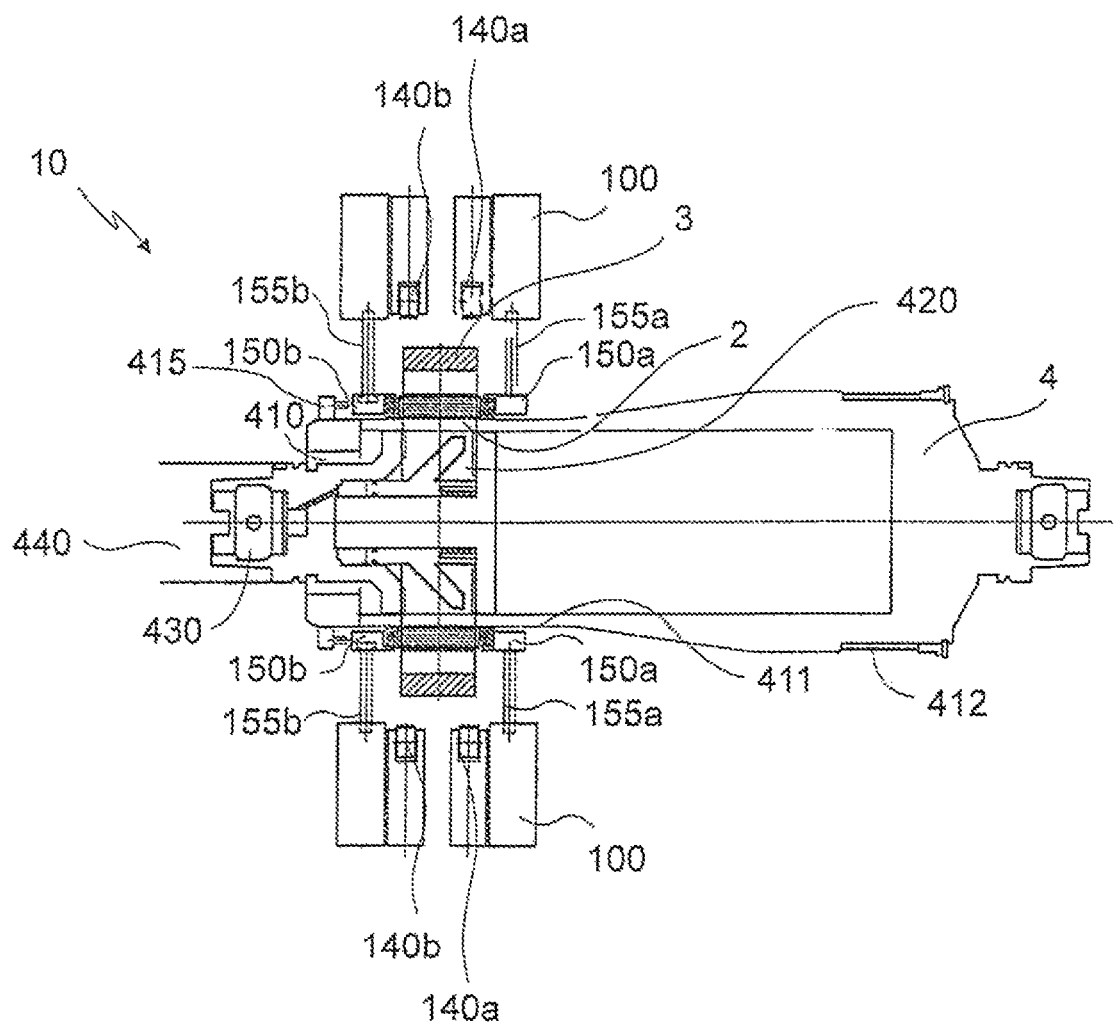

This results in the state shown in FIG. 17, in which the wire package 2 is still held by the holding-down devices 150 radially inward in the receptacles between the fins 420.

Figure 18:
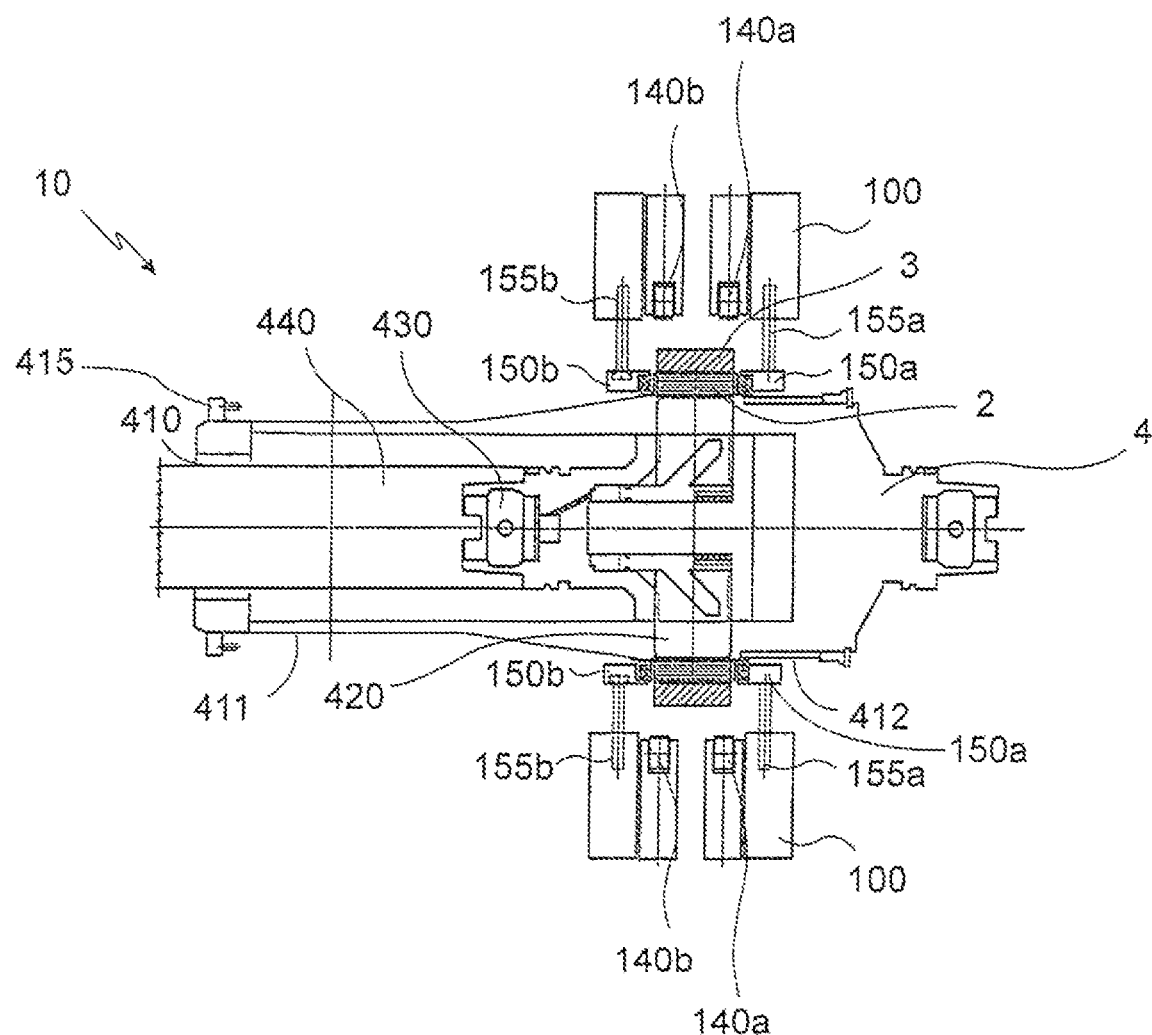

At this point, the press-insertion mandrel 410 is shifted to the left. At the same time, however, the wire package 2 is prevented by the holding-down devices 150, which are connected to the stationary apparatus 100, from undergoing an axial movement. As a result, the wire package 2 comes successively in contact with sections of the press-insertion mandrel 410 which have an ever-increasing and/or greater diameter. The diameter of the wire package 2 is enlarged in this way, and pushed outward. As a result, the wire package 2 is inserted radially into the grooves of the component 3; the holding-down devices 150 can be slightly pressed radially outward since the associated compression tools 155 can yield accordingly to such a movement. The resulting state is shown in FIG. 18. It can be seen that the wire package 2 and the fins 420, which are also held in position during the leftward axial movement of the press-insertion mandrel 410, are now arranged on the lateral region 412 of the press-insertion mandrel 410—that is, the region of larger diameter.

Figure 19:
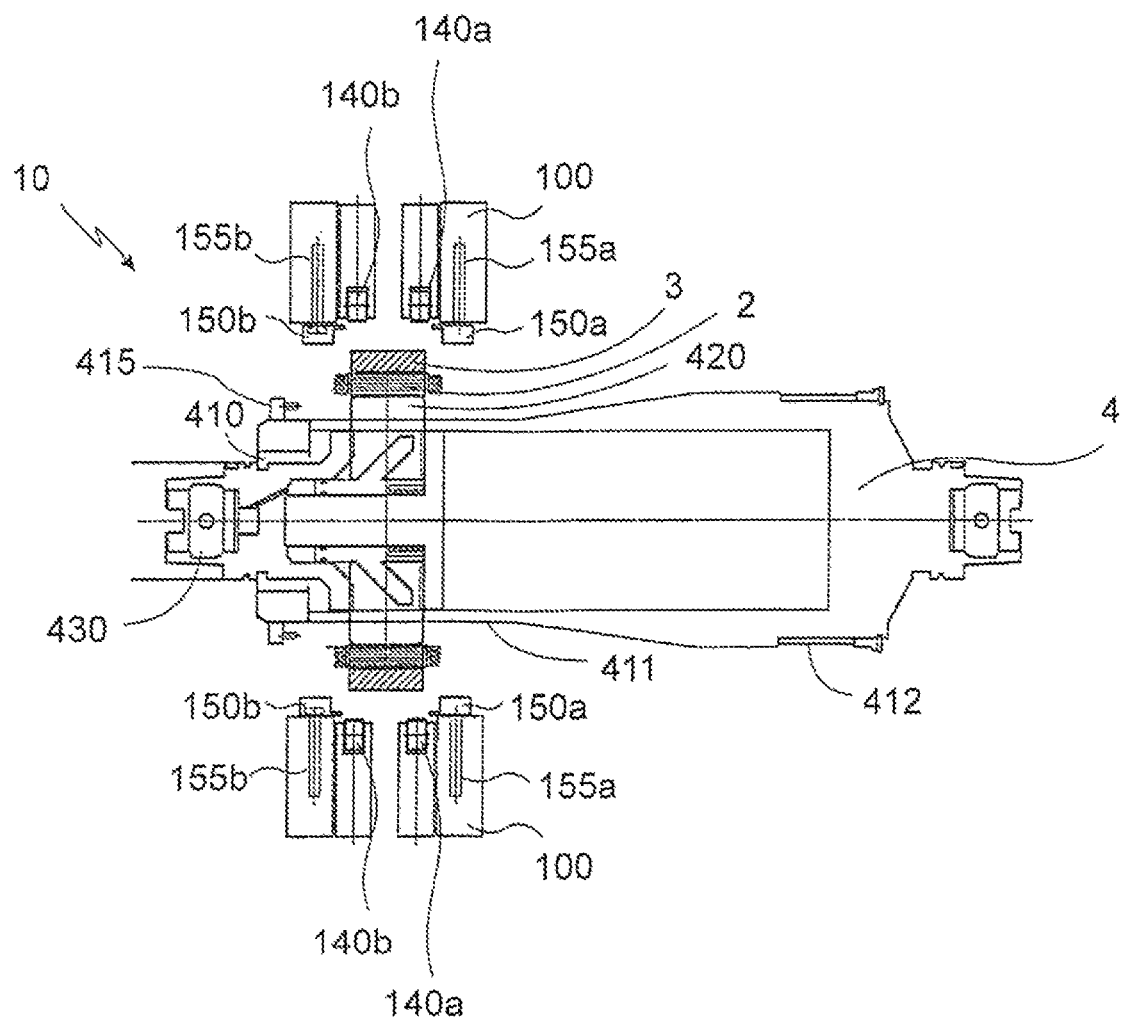

Subsequently, the press-insertion mandrel 410 is again moved to the right. The component 3 with the now-inserted wire package 2 can thus be removed to the left from the package carrier 4. This is illustrated in FIG. 19. As such, the process of inserting the wire package 2 into the component 3 has been completed, such that the component 3 can be used or further processed.

Figure 20A:
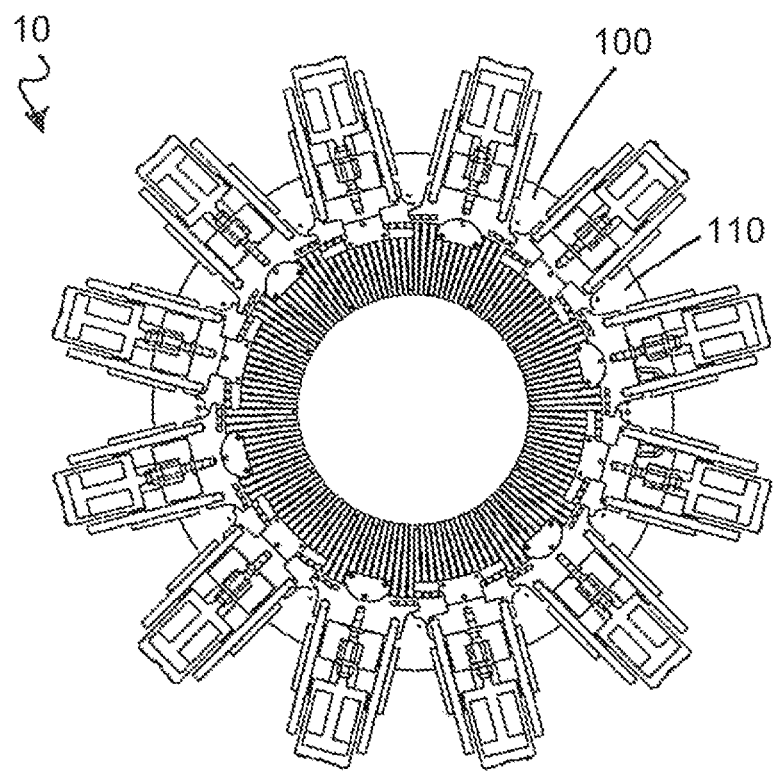
FIGS. 20 and 21 consists of FIGS. 20A and 21A: show an alternative embodiment of the press-insertion apparatus according to the invention, in the open (FIG. 20A) and closed (FIG. 21A) states.
FIGS. 20B and 21B: show a detail view of FIGS. 20A and 21A.
Figure 20B:
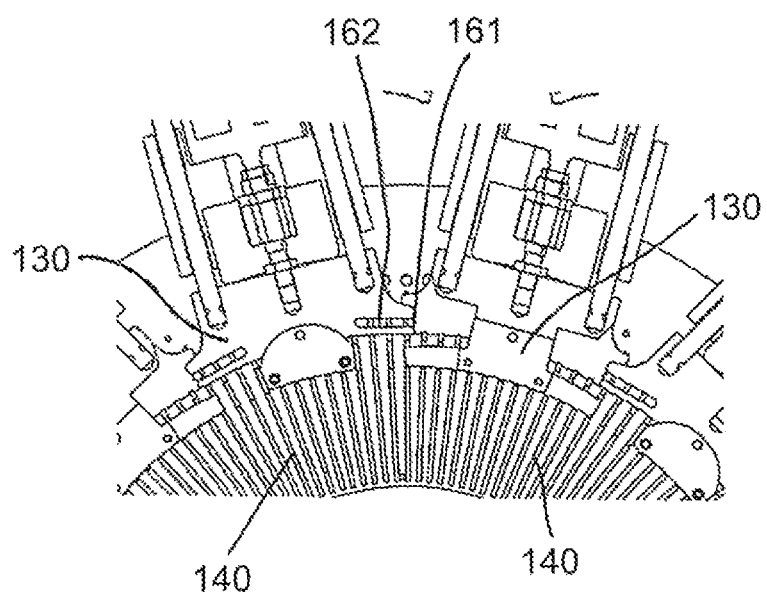
Figure 21A:
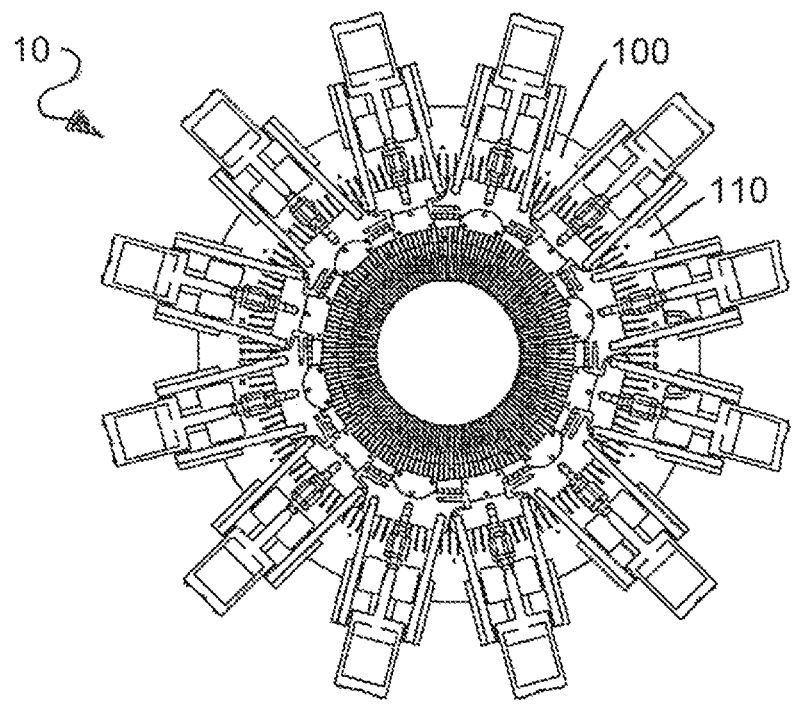
Figure 21B:
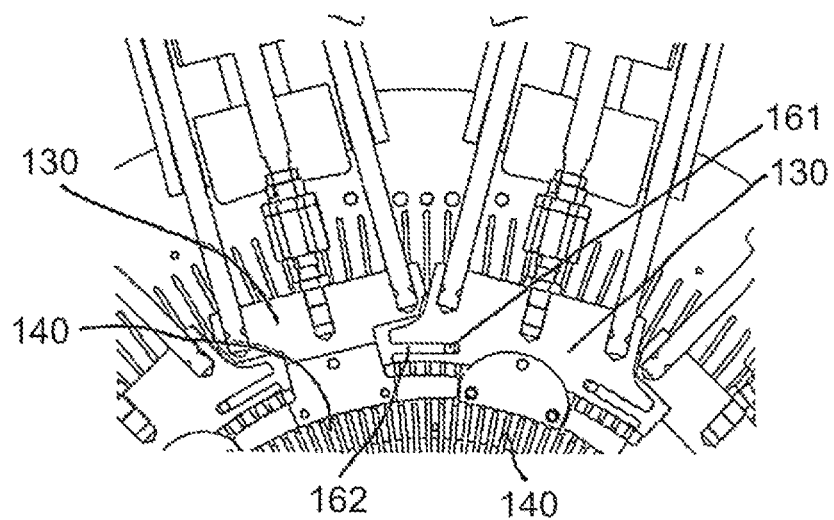

FIGS. 20A and 21A show a further alternative embodiment of the press-insertion apparatus 100. The construction shown here is basically comparable to the construction shown in FIG. 8—only the differences will be discussed. The figures show a press-insertion apparatus for pressing a wire package 2 into a plurality of receptacles of a package carrier 4, wherein the press-insertion apparatus 100 comprises:

a ring-shaped frame 110 which can be positioned around the package carrier 4, a number of push-in elements 130 which each carry a plurality of slider-like press-insertion elements 140, designed to move each press-insertion element 140 radially in the direction of the package carrier 4 such that the press-insertion element 140 presses at least a portion of the wire package into the respective receptacle.

In this case, each press-insertion element 140a inserts a portion of the wire package 2 for a groove into the same. However, it is also possible that the press-insertion element 140 services parts of the wire package for a plurality of grooves simultaneously.

The insertion of the wire winding into the respective groove is carried by a radial movement and/or narrowing of the radius of the push-in elements 130. In the embodiment shown here, it is advantageous that the package carrier 4 need not move relative to the frame 110, since the number of slider-like press-insertion elements 140 corresponds to the number of grooves which are to be filled with wire sections of the wire winding, such that all of the grooves can be reached.

The radial narrowing movement (which leads to the insertion of the wires into the grooves) of the individual push-in elements 130 towards each other is preferably performed synchronously. To achieve this, a first push-in element 130 is advantageously equipped with a pin 161, and the pin projects into an elongated hole 162 of the second push-in element (130) arranged adjacently on the frame. Expediently, the elongated hole 162 is oriented tangentially or in the direction of a passant, in the circumferential direction, with respect to the cylindrical region of the package e carrier 4, and functions to ensure that a push-in element 130 passing by is accordingly braked by the concatenation with the adjacent push-in element 130, or entrains the same accordingly at a slower speed. Therefore, the drive mechanism 134—for example, a pneumatically operated working cylinder—can be designed and/or controlled with lower precision. It should be noted in this case that this synchronized concatenation of course can also be realized in the variant of FIG. 8.

Below, possible features of the suggestion are listed in a structured manner. The following features listed in a structured manner can be combined with each other in any arbitrary way, and can be included in any combination in the claims of the application. A person skilled in the art will recognize that the invention is realized even from the subject matter with the fewest features. In particular, the following includes advantageous or possible embodiments—but not each individual possible embodiment of the invention.

The invention comprises:

A method for the installation of a wire package (2), consisting of a plurality of wire windings (20), into a component (3) such as a stator (30) or a rotor of an electrical machine, wherein the component (3) has a plurality of grooves (31) which run longitudinally and which are included for the purpose of accommodating wire sections (21) of the wire windings (20), wherein the wire package (2) is held by a package carrier (4), the package carrier (4) is positioned with the wire package (2) on or in the component (3), and at least a part (42) of the package carrier (4) or at least one element (5, 50, 51) which engages against the package carrier (4) is moved in such a manner that least a portion of the wire package (2) is moved into at least one groove (31) of the component (3) in a movement which is radial with respect to a component axis (32).

The method named above, wherein the respective wire section(s) (21) of the wire package (2) is/are simultaneously moved into several or all of the grooves (31), and/or the package carrier (4) is positioned with the wire package (2) relative to the component (3) in such a manner that each of the wire sections (21) are situated opposite the respective grooves (31) which receive the wire sections (221) before the radial movement (22) begins The method named above, wherein the package carrier (4) positions the wire package (2) in a frustoconical (23) arrangement relative to the component (3), then the package carrier (4) moves in such a manner that the wire package (2) is moved into a cylindrical arrangement (24), while at the same time the individual wire sections (21) are detached from the package carrier (4) and pushed into the respective grooves (31), and/or after the package carrier (4) is positioned relative to the component (3), the element (5) engages against the package carrier (4) and the element (5) detaches, by a radial movement (22) relative to the component axis (32), the wire sections (21) from the package carrier (4) and pushes them into the respective grooves (31).

The above method, wherein the package carrier (4) is rotated in a rotational movement (40) about the component axis (32), and the element (5) has a glide edge (50) which, in conjunction with the rotational movement 40, separates the wire sections (21) from the package carrier (4) and inserts them into the respective grooves (31), and/or at least one element (50, 51) is included on both sides of the package carrier (4) relative to the component axis (32), and detaches the wire sections (221) from the package carrier (4) during the rotational movement, and inserts them into the respective groove (31).

The method named above, wherein the diameter of the base of the frustoconical (23) arrangement is greater than the inside diameter of the component (3), such that the individual wire sections (21) are guided by the respective grooves (31) during the positioning movement (41) of the package carrier (4) relative to the component (3).

An apparatus for the installation of a wire package (2), consisting of a plurality of wire windings (20), into a component (3) such as the stator (30) or rotor of an electrical machine, wherein the apparatus (1) has a package carrier (4) which is designed to receive the wire package (2), and a part (42) of the package carrier (4) or at least one element (5) which can engage against the package carrier (4) effects a movement of at least a portion of the wire package (2), and the apparatus is particularly provided for the purpose of carrying out the method above.

The apparatus named above, wherein the apparatus (1) has a component receptacle, and the component receptacle and the package carrier (4) can be moved toward each another—and particularly can be rotated relative to each other—and/or the package carrier (4) has a cylindrical, frustoconical or circular shape, and has a plurality of the holding elements (43) for different wire sections (21) of the wire windings (20) on the inside or outside thereof.

The apparatus named above, wherein an element (5, 50, 51) can engage against the package carrier (4) on both sides of the package carrier (4), relative to the component axis (32), and be moved relative to the same, and/or the package carrier (4) and component receptacle can undergo the same—particularly synchronous—rotational movement.

The apparatus named above, wherein the package carrier (4) has a base body (44) with a plurality of retaining bars

(42) arranged on the circumference thereof, wherein the retaining bars (42) are provided for retaining the wire sections (21), and the individual retaining bars (42) are each held on the base body (44) with articulation at articulation points (45), and particularly a link lever (46) is functionally assigned to each retaining bar (42), and is connected with articulation on one end to the retaining bar (42), and is connected with articulation on the other end to the base body (44).

The apparatus named above, wherein the package carrier (4) has a pivot drive which acts on the retaining bars (42) held with articulation, and is able to pivot these about the articulation points (45), and/or the element (5) can engage the package carrier (4), and work together with the link levers (46) or the retaining bars (42) during the engagement movement, such that it is able to pivot the retaining bars (42) about the articulation points (45).

A method for the installation of a wire package (2), consisting of a plurality of wire windings (20), into a component (3), such as a stator or a rotor of an electrical machine, wherein the component (3) has a plurality of grooves which run longitudinally and which are included for the purpose of receiving wire sections (21) of the wire windings (20), wherein the wire package (2) is held by a package carrier (4) which has at least one conical section (60), the package carrier (4) with the wire package (2) is positioned on or in the component (3), and the package carrier (4) is moved relative to the component (3) while retaining the wire package (2), in such a manner that the conical section (60) passes through the wire package (2), thereby moving at least a part of the wire package (2) into at least one groove of the component (3) in a radial movement relative to a component axis (32).

The method named above, wherein the package carrier has a first cylindrical section which adjoins the conical section, and a radius which corresponds to the smallest radius of the conical section, wherein the wire package is initially arranged on the first cylindrical section.

The method named above, wherein the package carrier has a second cylindrical section which adjoins the conical section, and a radius which corresponds to the largest radius of the conical section, wherein the wire package is arranged on the second cylindrical section after the movement into the at least one groove.

The method named above, wherein the package carrier has a sliding cover transport section on which a number of sliding covers are arranged, on the outside thereof, wherein, as a result of further movement of the package carrier after the movement of the wire package into the at least one groove, the sliding cover transport section brings each sliding cover into the respective grooves.

The method named above, wherein the sliding covers close the respective grooves after insertion.

The method named above, wherein the sliding covers are inserted by means of a separate tool.

The method named above, wherein the package carrier has a fin-shaped winding carrier which receives the wire windings of the wire package.

The method named above, wherein the respective wire section(s) of the wire package is/are simultaneously moved into several or all of the grooves, and/cr the package carrier is positioned with the wire package relative to the component in such a manner that each of the wire sections are situated opposite the respective grooves which receive the wire sections before the radial movement begins.

An apparatus for the installation of a wire package, consisting of a plurality of wire windings, into a component such as the stator or rotor of an electrical machine, wherein the apparatus has a package carrier to receive the wire package, and a conical section for expanding the wire package when it passes through the wire package, wherein the apparatus is designed in particular for carrying out the method according to the invention, particularly the method just described.

The apparatus named above, wherein the package carrier includes a first cylindrical section which adjoins the conical section, and a radius which corresponds to the smallest radius of the conical section, wherein the first cylindrical section is designed to hold the wire package before installation.

The apparatus named above, wherein the package carrier has a second cylindrical section which adjoins the conical section, and a radius which corresponds to the largest radius of the conical section, wherein the second cylindrical section is designed to hold the wire package after the movement into the at least one groove.

The apparatus named above, wherein a retaining tool for the wire package is functionally assigned to the package carrier.

The apparatus named above, wherein the package carrier has a sliding cover transport section, which is designed to receive a number of sliding covers on the outside thereof, and which adjoins the conical section or the second cylindrical section so as to bring the sliding covers into the grooves after the installation of the wire windings, wherein a sliding cover insertion tool is preferably functionally assigned to the sliding cover transport section.

The apparatus named above, wherein the package carrier comprises a fin-shaped winding carrier for receiving the wire windings of the wire package.

A press-insertion apparatus for pressing a wire package (2) into a plurality of receptacles of a package carrier (4), wherein the press-insertion apparatus (100) has the following:
  a frame (110) which can be positioned around the package carrier (4),
  a number of press-insertion elements (140), wherein each press-insertion element (140) can be moved along a respective orbit path, and wherein each press-insertion element (120) is fixed on the frame (110) in a manner allowing radial displacement, and
  a number of press-insertion elements (130), wherein one push-in element (130) is functionally assigned to each press-insertion element (140), and is designed to move the respective press-insertion element (140) radially in the direction of the package carrier (4) such that the press-insertion element presses the wire package (2) further into the respective receptacle.

A further press-insertion apparatus for pressing a wire package (2) into a plurality of receptacles of a package carrier (4), wherein the press-insertion apparatus (100) has the following:
  a frame (110) which can be positioned around the package carrier (4),
  a number of push-in elements which each carry a plurality of press-insertion elements, designed to move each press-insertion element radially in the direction of the package carrier such that the press-insertion element presses at least a portion of the wire package into the respective receptacle.

The press-insertion apparatus named above, wherein the frame (110) is circular in shape.

The press-insertion apparatus named above, wherein a first push-in element (130) is equipped with a pin (161), and the pin (161) protrudes into a slot (162) of the second push-in element (130) arranged adjacent thereto on the frame.

The press-insertion apparatus named above, wherein the frame (110) can be positioned relative to the package carrier (4), in such a manner that the package carrier (4) is arranged centrally and/or coaxially to the frame (110).

The press-insertion apparatus named above, wherein the press-insertion elements (140) are each designed as circulating belts.

The press-insertion apparatus named above, wherein each belt circulates around a plurality of—preferably—three gears (120).

The press-insertion apparatus named above, wherein two radially-inner gears (120) define each of the contact surfaces of the press-insertion element (140) on the package carrier (4) and/or the wire package (2).

The press-insertion apparatus named above, wherein the radially-inner gears (120) are designed to allow radial displacement relative to a central axis along respective displacement paths (124), wherein the package carrier (4) can be positioned coaxially to the central axis.

The press-insertion apparatus named above, wherein each of the press-insertion elements (140) can be driven by its own drive—in particular, driven rotationally.

The press-insertion apparatus named above, wherein the radially-inner gears (120) are grouped into pairs of two, wherein the respective gears (120) of each pair of two can be synchronously displaced via a shared push-in element (130).

The press-insertion apparatus named above, herein the press-insertion elements (140) designed as belts can be driven rotationally.

The press-insertion apparatus named above, wherein each of the radially-inner gears (120) can be moved by link levers (132) of each respective push-in element (130) along the displacement paths (124), particularly in pairs.

The press-insertion apparatus named above, wherein the frame (110) is designed to rotate relative to the package carrier (4) during the press-insertion.

The press-insertion apparatus named above, wherein the press-insertion apparatus (100) has a frame drive for moving the frame (110) rotationally relative to the package carrier (4).

The press-insertion apparatus named above, wherein the frame drive is synchronized with the respective press-insertion elements (140), such that the respective belts on the package carrier (4) remain stationary around the circumference.

The press-insertion apparatus named above, wherein the displacement paths (124) are prespecified by respective guide rails formed on the frame (110).

The press-insertion apparatus named above, wherein the press-insertion apparatus (100) has a number of further press-insertion elements (140b), which are arranged mirror-inverted to the press-insertion elements (140a) with respect to a mirror plane, and which are designed functionally corresponding to the press-insertion elements (140a).

The press-insertion apparatus named above, wherein the press-insertion apparatus (100) further comprises a first set of holding-down devices (150a), which are arranged next to the press-insertion elements (140a) and which are designed to hold down the wire package (2) on the package carrier (4), particularly during the press-insertion.

The press-insertion apparatus named above, herein the press-insertion apparatus (100) further comprises a first set of compression tools (155a) to which the holding-down devices (150a) of the first set can be attached, and by means of which the holding-down devices (150a) can be pressed in the direction of the wire package (2).

The press-insertion apparatus named above, herein the press-insertion apparatus (100) further comprises a second set of holding-down devices (150b), which are arranged next to the press-insertion elements (140a) or the further press-insertion elements (140b), and which are designed to hold down the wire package (2) on the package carrier (4), particularly during the press-insertion.

The press-insertion apparatus named above, wherein the press-insertion apparatus (100) further comprises a second set of compression tools (155b) to which the holding-down devices (150b) of the second set can be attached, and by means of which the holding-down devices (150b) can be pressed in the direction of the wire package (2).

The press-insertion apparatus named above, wherein the holding-down devices (150) of at least the first and/or the second set are designed to be temporarily locked to the package carrier (4).

A package carrier for inserting a wire package (2) into a component (3), particularly a stator or a rotor of an electric motor, wherein the package carrier (4) has the following:
  a press-insertion mandrel (410) which extends along an axis,
  a number of fins (420) which can be adjusted radially, wherein they protrude radially, at least when extended, from the press-insertion mandrel (410), wherein a receptacle for a portion of the wire package (2) is formed between each pair of two circumferentially adjacent fins (420),
  an actuating device (430) which is designed to radially retract and extend the fins (420), and
  a displacement device (440) which is designed to move the fins (420) along the axis.

The package carrier named above, wherein the press-insertion mandrel (410) has, at least partially, or in a conical section (413), a conical shape which widens along the axis.

The package carrier named above, wherein the press-insertion mandrel (410) is radially symmetric with respect to the axis.

The package carrier named above, wherein the actuating device (430) has a pneumatic or hydraulic design.

The package carrier named above, wherein the actuating device (430) has a piston with an outer and inner cone for pushing out the fins (420).

The package carrier named above, wherein the package carrier (4) has a locking mechanism for releasably and/or temporarily locking holding-down devices (150) of a press-insertion apparatus (100) for the press-insertion of a wire package (2).

The package carrier named above, wherein the package carrier (4) is designed to cooperate with a press-insertion apparatus (100) as described above.

A method for inserting a wire package into a plurality of receptacles of a package carrier, the method comprising the steps of:
  furnishing the package carrier, wherein the wire package is received in the receptacles,
  inserting the package carrier into a press-insertion apparatus for press-insertion of the wire package,
  moving press-insertion elements of the press-insertion apparatus in the direction of the package carrier, such that the press-insertion elements press-in the wire package.

The method named above, wherein the press-insertion apparatus is a press-insertion apparatus as mentioned above.

The method named above, wherein the package carrier is a package carrier as mentioned above.

The method named above, wherein the package carrier and press-insertion apparatus are rotated relative to each other during the method.

The method named above, wherein the wire package is wound on the press-insertion mandrel, such that it is received in the receptacles.

The method named above, wherein, prior to the winding of the wire package, groove insulation is inserted into the receptacles, such that it is arranged between the wire package and the press-insertion mandrel when the wire package is received in the receptacles.

The method named above, wherein the groove insulation is an insulation paper.

The method named above, wherein the groove insulation is cut open and/or glued after the wire package is received.

The method named above, wherein the press-insertion mandrel has a first region and a second region along the axis, wherein the first region has a smaller diameter than the second region, and a conical region is arranged between the first region and the second region.

The method named above, wherein the wire package is wound on the second region of the press-insertion mandrel.

The method named above, wherein the wire package is pressed-in on the first region of the press-insertion mandrel.

The method named above, wherein the wire package is held down during the press-insertion by a number of holding-down devices of the press-insertion apparatus.

The method named above, wherein the wire package is held down on both axial ends by a number of holding-down devices during the press-insertion and/or after the press-insertion.

The method named above, wherein, after the press-insertion, holding-down devices can be locked on the package carrier on one axial end thereof, and compression tools assigned to the holding-down devices can be withdrawn, such that the wire package is accessible on one axial end.

The method named above, wherein, after the locking on one end from the accessible end, a component into which the wire package will be inserted is arranged radially outside of the wire package.

The method named above, wherein the package carrier can be moved, while the wire package is retained, after the arrangement of the component, such that the wire package is inserted into the component—in particular, in grooves of the component—due to an increase in the diameter of the package carrier.

The method named above, wherein, before the insertion of the wire package into the component, locked holding-down devices can be released.

The method named above, wherein during the insertion of the wire package into the component, holding-down devices remain on the wire package, and can be radially displaceable.

The method named above, wherein, after the insertion of the wire package, the component is removed from the package carrier, in particular over the first region.

The claims filed with the application at this point and later are without prejudice to the attainment of further protection.

If here, on closer examination, in particular also of the relevant prior art, one or another feature is favorable to the object of the invention but is not critically important, then of course a formulation is desired which no longer has such a feature, in particular in the main claim. Such a sub-combination is also covered by the disclosure of this application.

It should be further noted that the designs and variants of the invention described in the various embodiments and shown in the figures can be combined with each other in any manner. In this case, one or more features can be exchanged in any manner. These feature combinations are also disclosed at the same time.

The references in the dependent claims indicate the further development of the subject matter of the main claim by the features of the respective dependent claim. However, these should not be construed as a waiver to obtaining independent subject matter protection for the features of the dependent claims.

Features which have only been disclosed in the description, or individual features of claims comprising a plurality of features, may be transferred at any time to the independent claim(s), and considered as essential to the invention to establish a distinction from the prior art, even if such features have been mentioned in connection with other features and/or achieve particularly favorable results in connection with other features.

The invention claimed is:

1. An apparatus for installation of a wire package including a plurality of wire windings into a component, said apparatus comprising a package carrier and a press-insertion device, wherein the package carrier comprises the following:
    a press-insertion mandrel which extends along an axis,
    a number of fins which can be adjusted radially, wherein the fins protrude radially, at least when extended, from the press-insertion mandrel, wherein a receptacle for a portion of the wire package is formed between each pair of two circumferentially adjacent fins; and
    an actuating device designed to radially retract and extend the fins;
wherein the package carrier is configured for receiving the wire package inserted into the radially extracted fins and for retracting the fins with received wire package radially;
wherein the press-insertion device comprises press-insertion elements movable radially in direction of the package carrier and effecting a movement of at least a portion of the wire-package into the receptacle; and wherein the press-insertion device is adapted to be positioned around the package carrier.

2. The apparatus of claim 1, wherein the ae carrier further comprises a displacement device which is designed to move the fins along the axis.

3. The apparatus according to claim 1, wherein the press-insertion mandrel is radially symmetric with respect to the axis.

4. The apparatus according to claim 1, wherein the actuating device is pneumatic actuated.

5. The apparatus according to claim 1, wherein the actuating device has a piston with an outer and inner cone for pushing out the fins.

6. The apparatus according to claim 1, wherein the package carrier has a locking mechanism for releasably locking holding-down devices of the press-insertion device for the press-insertion of the wire package.

7. The apparatus according to claim 1, wherein the component is a part of an electric motor.

8. The apparatus according to claim 7 wherein the component is a stator of the electric motor.

9. The apparatus according to claim 1, wherein the component is a rotor of the electric motor.

10. The apparatus according to claim 1, wherein the actuating device is hydraulic actuated.

11. The apparatus according to claim 1, wherein the press-insertion mandrel has a conical shape which widens along the axis.

* * * * *